(12) United States Patent
Kim et al.

(10) Patent No.: US 12,019,829 B2
(45) Date of Patent: Jun. 25, 2024

(54) ELECTRONIC DEVICE AND INTERFACE DEVICE INCLUDING THE SAME

(71) Applicant: Samsung Display Co., Ltd., Yongin-si (KR)

(72) Inventors: Changbum Kim, Yongin-si (KR); Jina Kang, Yongin-si (KR); Miyoung Kim, Yongin-si (KR); Kangwon Lee, Yongin-si (KR); Byeongkyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/104,725

(22) Filed: Feb. 1, 2023

(65) Prior Publication Data
US 2023/0409146 A1    Dec. 21, 2023

(30) Foreign Application Priority Data

Jun. 20, 2022 (KR) .................. 10-2022-0075073

(51) Int. Cl.
*G06F 3/041* (2006.01)
*G06F 3/0354* (2013.01)
*G06F 3/038* (2013.01)

(52) U.S. Cl.
CPC ...... *G06F 3/04186* (2019.05); *G06F 3/03545* (2013.01); *G06F 3/0383* (2013.01); *G06F 3/04162* (2019.05); *G06F 2203/04106* (2013.01)

(58) Field of Classification Search
CPC ............ G06F 3/04186; G06F 3/04162; G06F 2203/04106; G06F 3/03545; G06F 3/0383; G06F 3/0446
See application file for complete search history.

(56) References Cited

U.S. PATENT DOCUMENTS

| | | | |
|---|---|---|---|
| 10,496,205 B2 | 12/2019 | Jung et al. | |
| 2004/0130537 A1* | 7/2004 | Kong | G06F 3/04186 |
| | | | 345/173 |
| 2011/0037727 A1 | 2/2011 | Lee et al. | |

(Continued)

FOREIGN PATENT DOCUMENTS

| | | |
|---|---|---|
| KR | 10-1007045 B1 | 1/2011 |
| KR | 10-2018-0077375 A | 7/2018 |
| KR | 10-2020-0005874 A | 1/2020 |

*Primary Examiner* — Temesghen Ghebretinsae
*Assistant Examiner* — Ivelisse Martinez Quiles
(74) *Attorney, Agent, or Firm* — Lewis Roca Rothgerber Christie LLP

(57) ABSTRACT

An electronic device includes: a display layer; a sensor layer to operate in a first mode for detecting a first input by a touch, and a second mode different from the first mode and including a plurality of frames; and a sensor controller to control the sensor layer. Each of the plurality of frames includes a downlink signal including information used to detect a second input by an input device, and a sensing signal including information used to detect the first input. When the first input is detected in the second mode, the sensor controller is to: output first coordinates of the first input based on the sensing signal of at least one frame in which the first input is detected; and correct second coordinates of the second input based on the first coordinates during a period of at least two frames including the at least one frame.

20 Claims, 17 Drawing Sheets

(56) References Cited

U.S. PATENT DOCUMENTS

| | | | |
|---|---|---|---|
| 2013/0300696 A1* | 11/2013 | Haran | G06F 3/0418 |
| | | | 345/173 |
| 2015/0309597 A1* | 10/2015 | Fujii | G06F 3/03545 |
| | | | 345/173 |
| 2021/0263631 A1 | 8/2021 | Kim et al. | |
| 2022/0057882 A1* | 2/2022 | Lee | G06F 3/0446 |
| 2022/0100340 A1* | 3/2022 | Oh | G06F 3/04166 |
| 2022/0137768 A1* | 5/2022 | Lee | G06F 3/04162 |
| | | | 345/173 |
| 2022/0181394 A1* | 6/2022 | Moon | G06F 3/04182 |

\* cited by examiner

ELECTRONIC DEVICE AND INTERFACE DEVICE INCLUDING THE SAME

CROSS-REFERENCE TO RELATED APPLICATION

This application claims priority to and the benefit of Korean Patent Application No. 10-2022-0075073, filed on Jun. 20, 2022, in the Korean Intellectual Property Office, the entire disclosure of which is incorporated by reference herein.

BACKGROUND

1. Field

Aspects of embodiments of the present disclosure relate to an electronic device having improved sensing reliability, and an interface device including the same.

2. Description of Related Art

An electronic device may detect an external input applied from the outside of the electronic device. The external input may be a user input. The user input may include various suitable kinds of external inputs, such as a part of a user's body, light, heat, a pen, or pressure. The electronic device may recognize coordinates of a pen in an electromagnetic resonance (EMR) method, or may recognize the coordinates of the pen in an active electrostatic (AES) method.

The above information disclosed in this Background section is for enhancement of understanding of the background of the present disclosure, and therefore, it may contain information that does not constitute prior art.

SUMMARY

Embodiments of the present disclosure are directed to an electronic device having improved sensing reliability, and an interface device including the same.

According to one or more embodiments of the present disclosure, an electronic device includes: a display layer; a sensor layer on the display layer, and configured to operate in a first mode for detecting a first input by a touch, and a second mode different from the first mode, the second mode including a plurality of frames; and a sensor controller configured to control the sensor layer. Each of the plurality of frames includes a downlink signal and a sensing signal, the downlink signal includes information used to detect a second input by an input device, and the sensing signal includes information used to detect the first input. When the first input is detected in the second mode, the sensor controller is configured to: output first coordinates of the first input based on the sensing signal of at least one frame in which the first input is detected from among the plurality of frames; and correct second coordinates of the second input based on the first coordinates during a period of at least two frames including the at least one frame.

In an embodiment, the sensor controller may be configured to ignore at least one of the second coordinates detected in the at least two frames based on the first coordinates.

In an embodiment, the electronic device may further include a display controller configured to operate the display layer in units of a display frame. The sensor controller may be configured to output information about a path for connecting the second coordinates detected in two frames that are spaced from each other with the at least one frame, in which the ignored at least one of the second coordinates is detected, being between the two frames, and the display controller may be configured to display the path on the display layer in the display frame after the at least two frames.

In an embodiment, the sensor controller may be configured to transmit an uplink signal to the input device, and operate the sensor layer in the first mode or the second mode based on an acknowledgment signal from the input device.

In an embodiment, when the acknowledgment signal is not received, the sensor controller may be configured to operate the sensor layer in the first mode, and when the acknowledgment signal is received, the sensor controller may be configured to operate the sensor layer in the second mode.

In an embodiment, the sensor layer may include: a plurality of first electrodes, each extending in a first direction; and a plurality of second electrodes, each extending in a second direction crossing the first direction.

In an embodiment, the downlink signal may include: a first signal including first information of the input device; a second signal including second information different from the first information; and a third signal including third information different from the first information and the second information.

In an embodiment, the first information may include coordinate information of the input device, and the third information may include slope information of the input device.

In an embodiment, the input device may be configured to provide each of the first signal and the second signal one or more times, and the input device may be configured to provide the downlink signal in an order of the first signal, the second signal, the first signal, the third signal, the first signal, the second signal, and the first signal. The sensor controller may be configured to provide the sensing signal after a last one of the first signal is provided, and the sensing signal may include a value detected by capacitively coupling the plurality of first electrodes and the plurality of second electrodes to one another.

In an embodiment, each of the first signal and the second signal may have a first signal frequency, and the third signal may have a second signal frequency different from the first signal frequency.

In an embodiment, the first signal frequency may be greater than the second signal frequency.

According to one or more embodiments of the present disclosure, an interface device includes: an electronic device including: a display layer; a sensor layer on the display layer; and a sensor controller configured to control the sensor layer; and an input device configured to communicate with the electronic device. The sensor layer is configured to operate in a plurality of frames, detect first coordinates by a touch, and detect second coordinates by the input device. Each of the plurality of frames sequentially includes an uplink signal, a downlink signal, and a sensing signal, the sensor layer is configured to provide the uplink signal to the input device, and the input device is configured to provide the downlink signal to the sensor layer. The sensing signal includes information to detect the touch, and when the touch is detected, the sensor controller is configured to: output the first coordinates based on the sensing signal of at least one frame in which the touch is detected from among the plurality of frames; and correct the second coordinates based on the first coordinates during a period of at least two frames including the at least one frame.

In an embodiment, the electronic device may further include a display controller configured to operate the display layer in units of a display frame. The sensor controller may be configured to output information about a path for connecting coordinates of the input device detected in two frames spaced from each other with the at least one frame, in which the touch is detected, from among the plurality of frames being between the two frames, and the display controller may be configured to display the path on the display layer in the display frame after the at least two frames.

In an embodiment, the input device may include: a housing: a power supply in the housing; a controller in the housing, and configured to receive power from the power supply; a communication circuit configured to exchange the uplink signal and the downlink signal with the sensor layer; and a pen electrode electrically connected to the communication circuit.

In an embodiment, the controller may be configured to generate the downlink signal according to a protocol, and the protocol may include universal stylus initiative (USI).

In an embodiment, the downlink signal may include a first signal including first information of the input device, a second signal including second information different from the first information of the input device, and a third signal including third information different from the first information and the second information. The first information may include coordinate information of the input device, and the third information may include slope information of the input device.

In an embodiment, the input device may be configured to provide each of the first signal and the second signal one or more times, the input device may be configured to provide the downlink signal in an order of the first signal, the second signal, the first signal, the third signal, the first signal, the second signal, and the first signal, and the sensor controller may be configured to provide the sensing signal after a last one of the first signal is provided.

In an embodiment, each of the first signal and the second signal may have a first signal frequency, and the third signal may have a second signal frequency different from the first signal frequency.

In an embodiment, the first signal frequency may be greater than the second signal frequency.

In an embodiment, the electronic device may be configured to concurrently receive the second signal and the third signal with each other.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
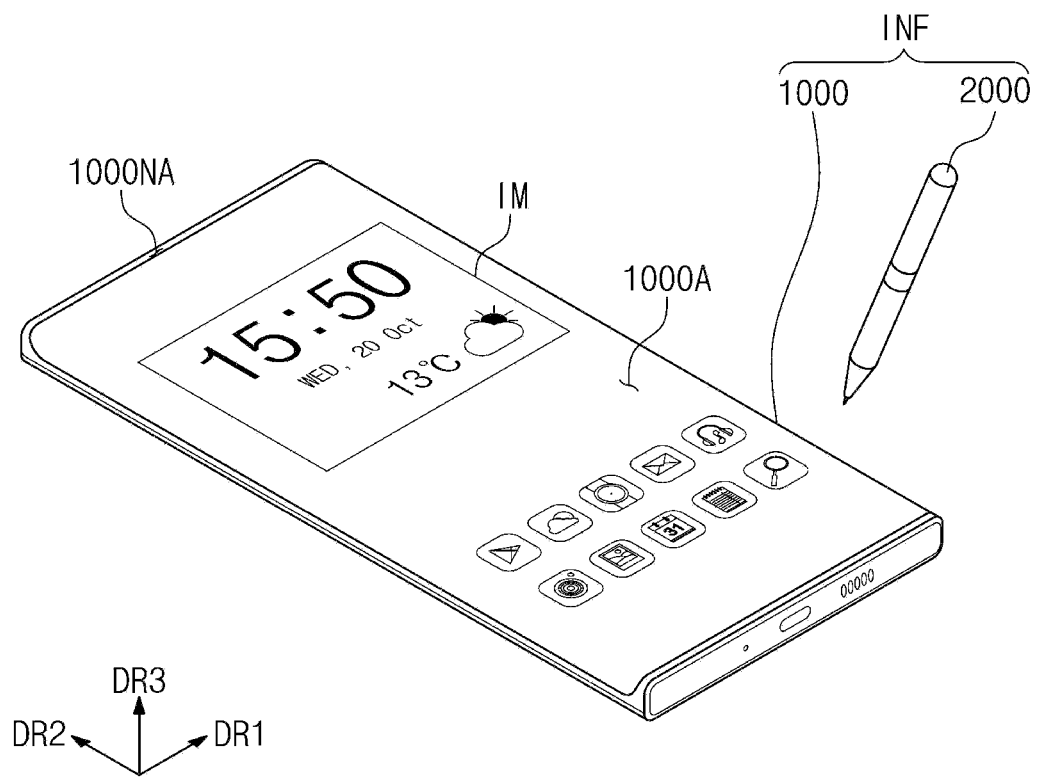
FIG. 1 is a perspective view illustrating an interface device, according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view illustrating an interface device, according to an embodiment of the present disclosure.

Referring to FIG. 1, an interface device INF may include an electronic device 1000 and an input device 2000.

The electronic device 1000 may be a device that is activated depending on an electrical signal. For example, the electronic device 1000 may be a mobile phone, a tablet, a car navigation system, a game console, or a wearable device, but is not limited thereto. FIG. 1 illustrates that the electronic device 1000 is a cellular phone as an example.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may surround (e.g., around a periphery of) the active area 1000A.

A thickness direction of the electronic device 1000 may be parallel to or substantially parallel to a third direction DR3 crossing (e.g., intersecting) the first direction DR1 and the second direction DR2. Accordingly, front surfaces (or upper surfaces) and back surfaces (or lower surfaces) of members constituting the electronic device 1000 may be defined with respect to the third direction DR3.

The electronic device 1000 may display an image IM in the third direction DR3. The image IM may include a still image, as well as a moving image. In FIG. 1, a clock and icons are illustrated as an example of the image IM.

The electronic device 1000 may detect inputs applied from the outside of the electronic device 1000. The inputs applied from the outside may include various suitable kinds of external inputs, such as a portion of a user's body, light, heat, pressure, or the like. The inputs applied from the outside may be referred to as a "first input".

The electronic device 1000 illustrated in FIG. 1 may detect an input by the user's touch, and an input by the input device 2000. The input device 2000 may refer to a device other than the user's body. The input by the input device 2000 may be referred to as a "second input". For example, the input device 2000 may be an active pen, a stylus pen, a touch pen, or an electronic pen.

The electronic device 1000 and the input device 2000 may be capable of bidirectional communication with each other. The electronic device 1000 may provide an uplink signal to the input device 2000. For example, the uplink signal may include a synchronization signal or information of the electronic device 1000, but is not particularly limited thereto. The input device 2000 may provide a downlink signal to the electronic device 1000. The downlink signal may include state information of the input device 2000 or a synchronization signal.

Figure 2:
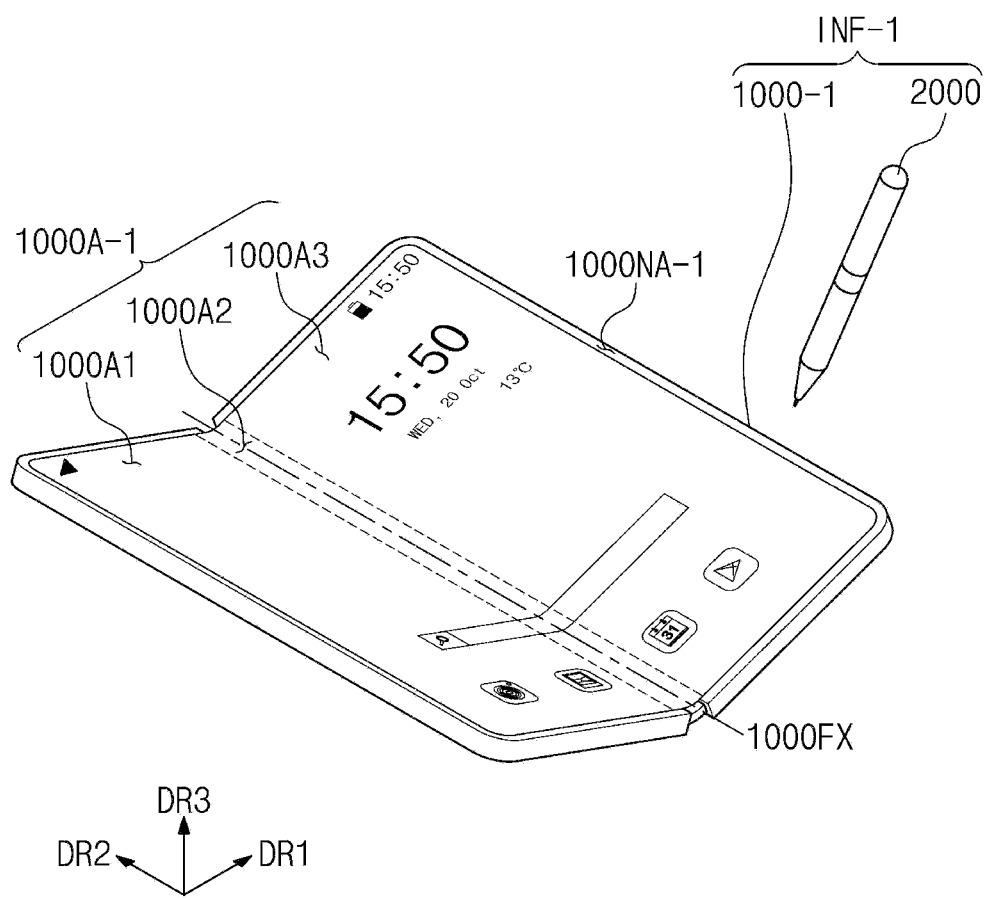
FIG. 2 is a perspective view illustrating an interface device, according to an embodiment of the present disclosure.

FIG. 2 is a perspective view illustrating an interface device, according to an embodiment of the present disclosure. In FIG. 2, the same reference numerals are assigned to the same or substantially the same components described above with reference to FIG. 1, and thus, redundant description thereof may not be repeated.

Referring to FIG. 2, an electronic device 1000-1 may display an image through an active area 1000A-1. In FIG. 2, it is illustrated that the electronic device 1000-1 is folded at an angle (e.g., a predetermined angle). The active area 1000A-1 may include a plane defined by the first direction DR1 and the second direction DR2, in a state where the electronic device 1000-1 is unfolded.

The active area 1000A-1 may include a first area 1000A1, a second area 1000A2, and a third area 1000A3. The first area 1000A1, the second area 1000A2, and the third area 1000A3 may be sequentially defined along the first direction DR1. The second area 1000A2 may be bent about a folding axis 1000FX extending in the second direction DR2. Accordingly, the first area 1000A1 and the third area 1000A3 may be referred to as "non-folding areas", and the second area 1000A2 may be referred to as a "folding area".

When the electronic device 1000-1 is folded, the first area 1000A1 and the third area 1000A3 may face each other. Accordingly, while the electronic device 1000-1 is fully folded, the active area 1000A-1 may not be exposed to the outside, which may be referred to as "in-folding". However, the present disclosure is not limited thereto. For example, an operation of the electronic device 1000-1 is not limited thereto.

For example, according to an embodiment of the present disclosure, when the electronic device 1000-1 is folded, the first area 1000A1 and the third area 1000A3 may be opposed to each other. Accordingly, in a state where the electronic device 1000-1 is folded, the active area 1000A-1 may be exposed to the outside, which may be referred to as "out-folding".

The electronic device 1000-1 may perform only one of an in-folding operation or an out-folding operation. As another example, the electronic device 1000-1 may perform both an in-folding operation and an out-folding operation. In this case, the same area of the electronic device 1000-1, for example, such as the second area 1000A2, may be both in-folded and out-folded.

One folding area and two non-folding areas are illustrated in FIG. 2, but the number of folding areas and the number of non-folding areas are not limited thereto. For example, the electronic device 1000-1 may include a plurality of non-folding areas in a number greater than two, and a plurality of folding areas interposed between the non-folding areas that are adjacent to one another.

FIG. 2 illustrates that the folding axis 1000FX extends in the second direction DR2, but the present disclosure is not limited thereto. For example, the folding axis 1000FX may extend in a direction parallel to or substantially parallel to the first direction DR1. In this case, the first area 1000A1, the second area 1000A2, and the third area 1000A3 may be sequentially arranged along the second direction DR2.

The active area 1000A-1 may overlap with at least one or more electronic modules (e.g., electronic components). For example, the electronic modules may include a camera module (e.g., a camera), a proximity illuminance sensor, and/or the like. The electronic modules may receive an external input delivered through the active area 1000A-1, or may provide an output through the active area 1000A-1. A part of the active area 1000A-1 that overlaps with the camera module, the proximity illuminance sensor, and/or the like may have a higher transmittance than that of other parts of the active area 1000A-1. Accordingly, an area of the peripheral area 1000NA-1 around the active area 1000A-1, in which a plurality of electronic modules are typically arranged, may be reduced or minimized. As a result, an area ratio of the active area 1000A-1 to the front surface of the electronic device 1000-1 may be increased.

The electronic device 1000-1 and the input device 2000 may be capable of bidirectional communication with each other. The electronic device 1000-1 may provide an uplink signal to the input device 2000. The input device 2000 may provide a downlink signal to the electronic device 1000-1. The electronic device 1000-1 may detect coordinates of the input device 2000 by using a signal provided from the input device 2000.

Figure 3:
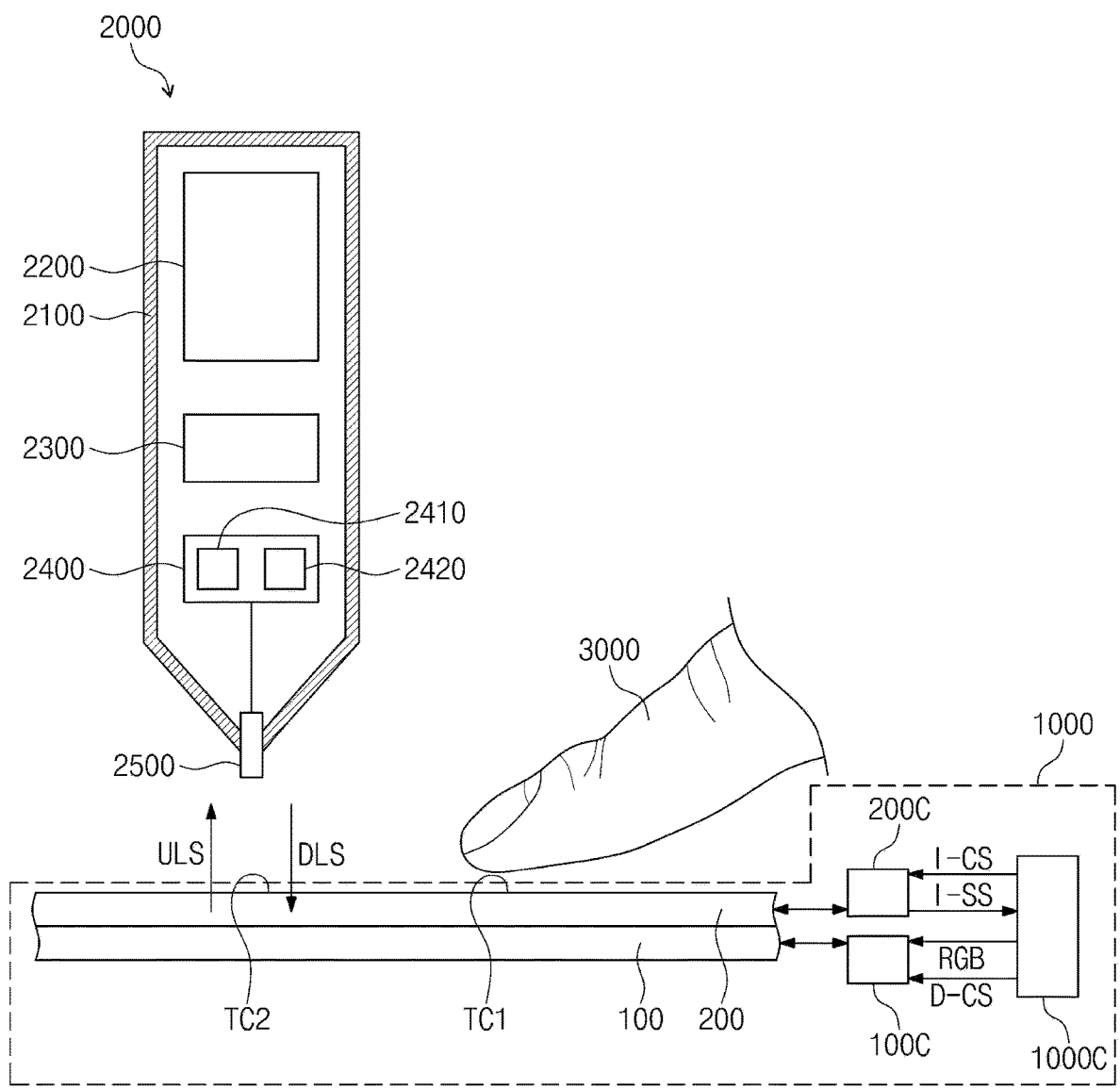
FIG. 3 is a block diagram schematically illustrating an electronic device and an input device, according to an embodiment of the present disclosure.

FIG. 3 is a block diagram schematically illustrating an electronic device and an input device, according to an embodiment of the present disclosure.

Referring to FIG. 3, the electronic device 1000 may include a display layer 100, a sensor layer 200, a display controller 100C, a sensor controller 200C, and a main controller 1000C.

The display layer 100 may be a configuration that generates or substantially generates an image. The display layer 100 may be a light emitting display layer. For example, the display layer 100 may be an organic light emitting display layer, a quantum dot display layer, a micro-LED display layer, or a nano-LED display layer.

The sensor layer 200 may be disposed on the display layer 100. The sensor layer 200 may detect an external input applied from the outside. The sensor layer 200 may detect a first input by the input device 2000, and a second input by a user's body 3000.

The main controller 1000C may control the overall operations of the electronic device 1000. For example, the main controller 1000C may control the operations of the display controller 100C and the sensor controller 200C. The main controller 1000C may include at least one microprocessor, and the main controller 1000C may be referred to as a "host".

The display controller 100C may control the display layer 100. The main controller 1000C may further include a graphic controller. The display controller 100C may receive image data RGB and a control signal D-CS from the main controller 1000C. The control signal D-CS may include various suitable kinds of signals. For example, the control signal D-CS may include an input vertical synchronization signal, an input horizontal synchronization signal, a main clock, and a data enable signal. The display controller 100C may generate a vertical synchronization signal and a horizontal synchronization signal for controlling a timing for providing a signal to the display layer 100, based on the control signal D-CS.

The sensor controller 200C may control the sensor layer 200. The sensor controller 200C may receive a control signal I-CS from the main controller 1000C. The control signal I-CS may include a clock signal, and a mode determination signal for determining a driving mode of the sensor controller 200C. The sensor controller 200C may operate in a first mode for detecting the first input TC1 by the user's body 3000, or in a second mode for detecting the second input TC2 by the input device 2000, based on the control signal I-CS. The sensor controller 200C may control the sensor layer 200 in the first mode or the second mode based on a mode determination signal described in more detail below.

The sensor controller 200C may calculate coordinate information of a first input or a second input based on a signal received from the sensor layer 200, and may provide a coordinate signal I-SS having the coordinate information to the main controller 1000C. The main controller 1000C executes an operation corresponding to a user input based on the coordinate signal I-SS. For example, the main controller 1000C may operate the display controller 100C, such that a new application image is displayed on the display layer 100, based on the coordinate signal I-SS. The display controller 100C and the sensor controller 200C may include at least one integrated circuit, microprocessor, or the like.

The input device 2000 may include a housing 2100, a power supply unit (e.g., a power supply) 2200, a controller 2300, a communication module (e.g., a communication circuit) 2400, and a pen electrode 2500. However, the components constituting the input device 2000 are not limited to the illustrated components. For example, the input device 2000 may further include an electrode switch for switching an operating mode to a signal transmission mode or a signal reception mode, a pressure sensor for sensing pressure, memory for storing information (e.g., predetermined information), or a rotation sensor for sensing a rotation.

The housing 2100 may have a pen shape, and an accommodation space may be formed in the housing 2100. The power supply unit 2200, the controller 2300, the communication module 2400, and the pen electrode 2500 may be accommodated in the accommodation space defined inside the housing 2100.

The power supply unit 2200 may supply a power source to the controller 2300 and the communication module 2400 inside the input device 2000. The power supply unit 2200 may include a battery or a high capacity capacitor.

The controller 2300 may control the operation of the input device 2000. The controller 2300 may be an application-specific integrated circuit (ASIC). The controller 2300 may be configured to operate depending on a designed program.

The communication module 2400 may include a transmission circuit 2410 and a reception circuit 2420. The transmission circuit 2410 may output a downlink signal DLS to the sensor layer 200. The reception circuit 2420 may receive the uplink signal ULS provided from the sensor layer 200. The transmission circuit 2410 may receive a signal provided from the controller 2300, and may modulate the signal into a signal capable of being sensed by the sensor layer 200. The reception circuit 2420 may modulate a signal provided from the sensor layer 200 into a signal processable by the controller 2300.

The pen electrode 2500 may be electrically connected to the communication module 2400. A portion of the pen electrode 2500 may protrude from the housing 2100. As another example, the input device 2000 may further include a cover housing that covers the pen electrode 2500 exposed from the housing 2100. As another example, the pen electrode 2500 may be embedded in the housing 2100.

Figure 4A:
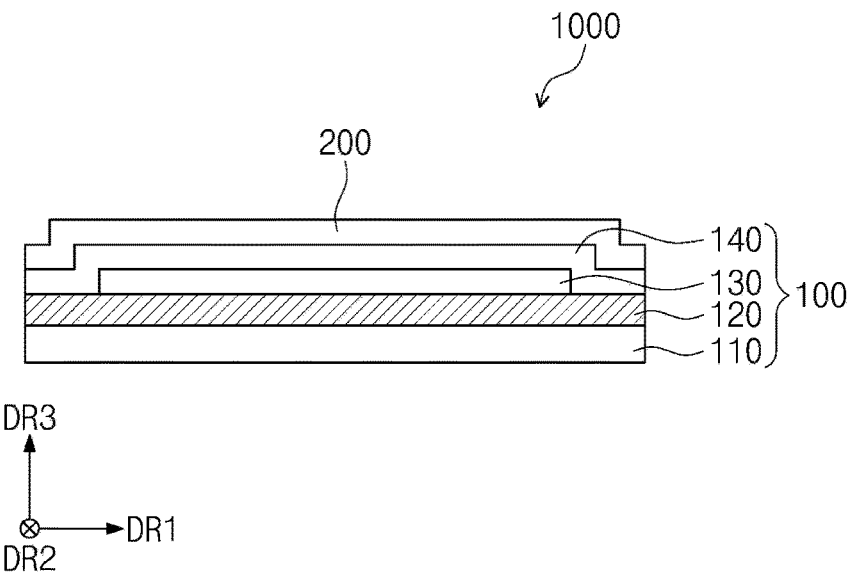
FIG. 4A is a cross-sectional view of an electronic device, according to an embodiment of the present disclosure.

FIG. 4A is a cross-sectional view of an electronic device, according to an embodiment of the present disclosure.

Referring to FIG. 4A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, or a polymer substrate. However, the present disclosure is not limited thereto, and the base layer 110 may be an inorganic layer, an organic layer, or a composite material layer.

The base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. As used herein, "~~"-based resin means including the functional group of "~~".

The circuit layer 120 may be disposed on the base layer 110. The circuit layer 120 may include an insulating layer, a semiconductor pattern, a conductive pattern, and a signal line. The insulating layer, a semiconductor layer, and a conductive layer may be formed on the base layer 110 in a suitable manner, such as coating, evaporation, or the like. Afterward, the insulating layer, the semiconductor layer, and the conductive layer may be selectively patterned by performing a photolithography process a plurality of times. Afterward, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances, such as moisture, oxygen, and dust particles.

The sensor layer 200 may be formed on the display layer 100 through a successive process. In this case, the sensor layer 200 may be expressed as being directly disposed on the display layer 100. Being "directly disposed" may mean that a third component is not interposed between the sensor layer 200 and the display layer 100. In other words, a separate adhesive member may not be interposed between the sensor layer 200 and the display layer 100. As another example, the sensor layer 200 may be connected to (e.g., coupled to or attached to) the display layer 100 through an adhesive member. The adhesive member may include a common adhesive or a common sticking agent.

Figure 4B:
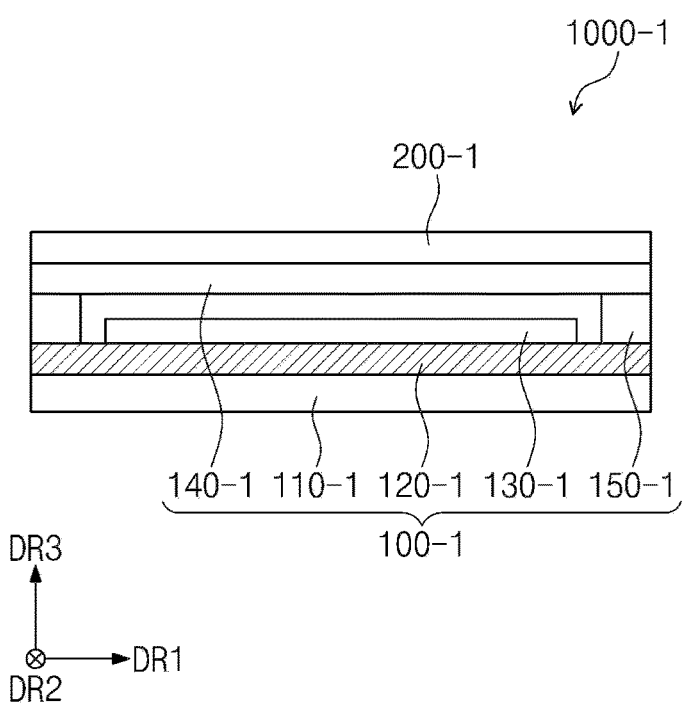
FIG. 4B is a cross-sectional view of an electronic device, according to an embodiment of the present disclosure.

FIG. 4B is a cross-sectional view of an electronic device, according to an embodiment of the present disclosure.

Referring to FIG. 4B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, a polymer substrate, or the like, but is not particularly limited thereto.

The coupling member 150-1 may be interposed between the base substrate 110-1 and the encapsulation substrate 140-1. The coupling member 150-1 may connect (e.g., may couple or attach) the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not particularly limited thereto.

The sensor layer 200-1 may be directly disposed on the encapsulation substrate 140-1. Being "directly disposed" may mean that a third component is not interposed between the sensor layer 200-1 and the encapsulation substrate 140-1. In other words, a separate adhesive member may not be interposed between the sensor layer 200-1 and the display layer 100-1. However, the present disclosure is not limited thereto, and an adhesive layer may be further interposed between the sensor layer 200-1 and the encapsulation substrate 140-1.

Figure 5:
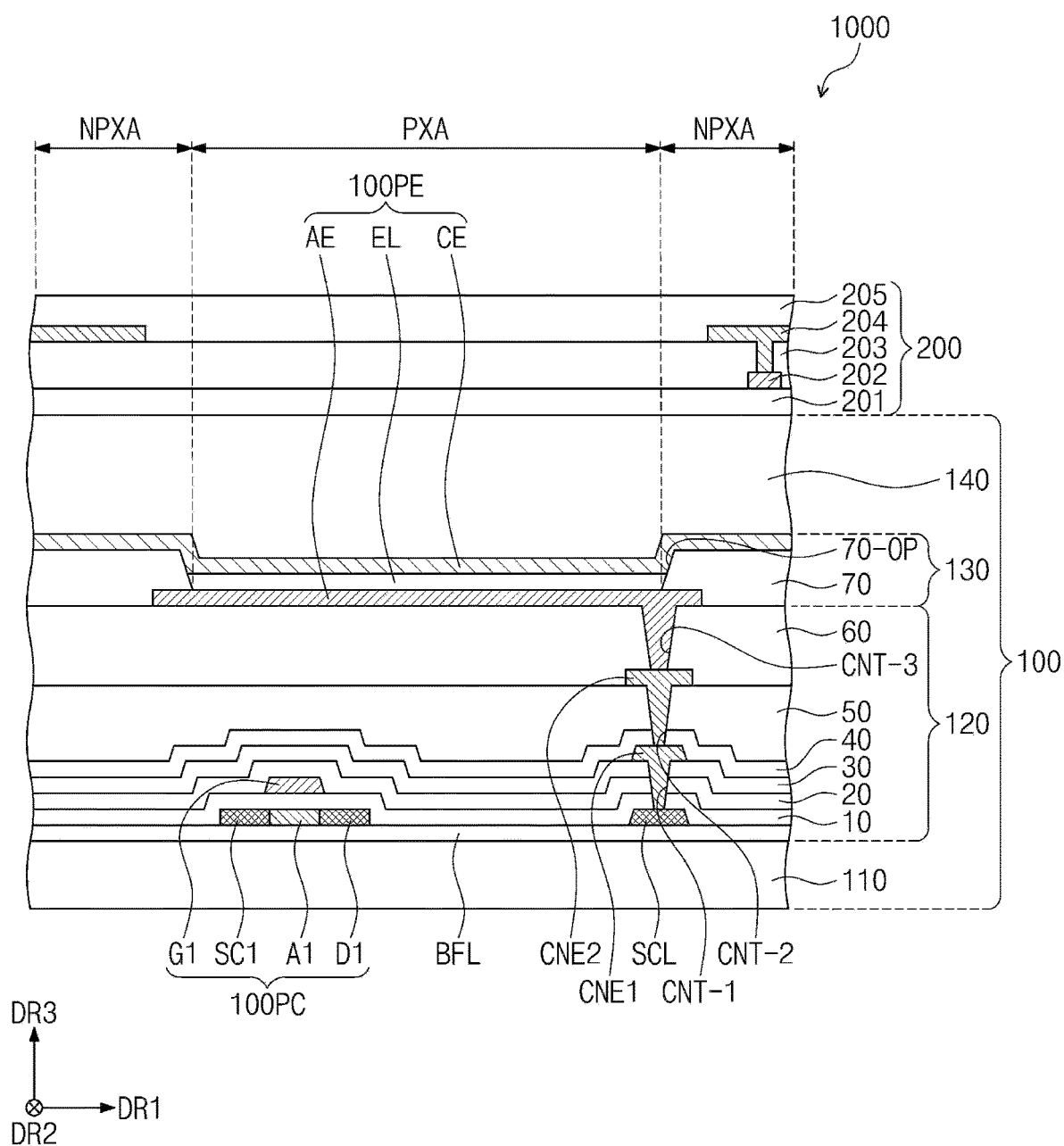
FIG. 5 is a cross-sectional view of an electronic device, according to an embodiment of the present disclosure.

FIG. 5 is a cross-sectional view of an electronic device, according to an embodiment of the present disclosure. In FIG. 5, the same reference numerals are assigned to the same or substantially the same components described above with reference to FIG. 4A, and thus, redundant description thereof may not be repeated.

Referring to FIG. 5, at least one inorganic layer may be formed on the upper surface of the base layer 110. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may improve a bonding force between the base layer 110 and a semiconductor pattern. The buffer layer BFL may include a silicon oxide layer and a silicon nitride layer. The silicon oxide layer and the silicon nitride layer may be stacked alternately.

The semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, or an oxide semiconductor.

FIG. 5 illustrates a part of the semiconductor pattern, and the semiconductor pattern may be further disposed in another area. The semiconductor pattern may be arranged in a suitable rule (e.g., a predetermined or specific rule) throughout the pixels. The semiconductor pattern may have different electrical characteristics depending on whether or not the semiconductor pattern is doped. The semiconductor pattern may include a first area having high conductivity, and a second area having low conductivity. The first area may be doped with an N-type dopant or a P-type dopant. A P-type transistor may include the doped area doped with a P-type dopant, and an N-type transistor may include the doped area doped with an N-type dopant. The second area may be an undoped area, or may be doped with a lower concentration than that of the first area.

The conductivity of the first area is greater than that of the second area. The first area may operate or substantially operate as an electrode or signal line. The second area may correspond to or substantially correspond to an active (or a channel) of a transistor. In other words, a part of the semiconductor pattern may be an active of the transistor. Another part thereof may be a source or drain of the transistor. Another part thereof may be a connection electrode or a connection signal line.

Each of the pixels may have an equivalent circuit including seven transistors, one capacitor, and a light emitting element. The equivalent circuit of a pixel may be modified in various suitable shapes. One transistor 100PC and one light emitting element 100PE included in a pixel are illustrated in FIG. 5 by way of example.

The transistor 100PC may include a source SC1, an active A1, a drain D1, and a gate G1. The source SC1, the active A1, and the drain D1 may be formed from the semiconductor pattern. The source SC1 and the drain D1 may extend in directions opposite to each other from the active A1 on a cross section. A part of a connection signal line SCL formed from the semiconductor pattern is illustrated in FIG. 5. The connection signal line SCL may be electrically connected to the drain D1 of the transistor 100PC on a plane (e.g., in a plan view).

A first insulating layer 10 may be disposed on the buffer layer BFL. The first insulating layer 10 may overlap with a plurality of pixels in common, and may cover the semiconductor pattern. The first insulating layer 10 may be an inorganic layer and/or an organic layer, and may have a single-layer or multi-layered structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10, but also an insulating layer of the circuit layer 120 described in more detail below, may be an inorganic layer and/or an organic layer, and may have a single-layer structure or a multi-layered structure. The inorganic layer may include at least one of the above-described materials, but is not limited thereto.

The gate G1 is disposed on the first insulating layer 10. The gate G1 may be a part of a metal pattern. The gate G1 overlaps with the active A1. In a process of doping the semiconductor pattern, the gate G1 may function as a mask.

A second insulating layer 20 is disposed on the first insulating layer 10, and may cover the gate G1. The second insulating layer 20 may overlap with a plurality of pixels in common. The second insulating layer 20 may be an inorganic layer and/or an organic layer, and may have a single-layer structure or a multi-layered structure. The second insulating layer 20 may include at least one of silicon oxide, silicon nitride, and silicon oxynitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50, and may cover the second connection electrode CNE2. The sixth insulating layer 60 may be an organic layer.

The light emitting element layer 130 may be disposed on the circuit layer 120. The light emitting element layer 130 may include a light emitting element 100PE. For example, the light emitting element layer 130 may include an organic light emitting material, a quantum dot, a quantum rod, a micro-LED, or a nano-LED. Hereinafter, for convenience, the light emitting element 100PE may be described in more detail in the context of an organic light emitting element, but the present disclosure is not particularly limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60, and may cover a portion of the first electrode AE. An opening 70-OP is defined in (e.g., penetrates) the pixel defining layer 70. The opening 70-OP of the pixel defining layer 70 exposes at least part of the first electrode AE.

The active area 1000A (e.g., see FIG. 1) may include an emission area PXA, and a non-emission area NPXA adjacent to the emission area PXA. The non-emission area NPXA may surround (e.g., around a periphery of) the emission area PXA. In an embodiment, the emission area PXA is defined to correspond to a partial area of the first electrode AE, which is exposed by the opening 70-OP.

The light emitting layer EL may be disposed on the first electrode AE. The light emitting layer EL may be disposed in an area defined by the opening 70-OP. In other words, the light emitting layer EL may be separately formed on each of the pixels. In the case where the light emitting layers EL are independently formed for the respective pixels, each of the light emitting layers EL may emit the light of at least one of a blue color, a red color, and a green color. However, the present disclosure is not limited thereto. For example, the light emitting layer EL may be connected and provided to each of the pixels in common. In this case, the light emitting layer EL may provide blue light or white light.

The second electrode CE may be disposed on the light emitting layer EL. The second electrode CE may be disposed in a plurality of pixels in common, while having an integral shape.

In some embodiments, a hole control layer may be interposed between the first electrode AE and the light emitting layer EL. The hole control layer may be disposed in common in the emission area PXA and the non-emission area NPXA. The hole control layer may include a hole transport layer, and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels by using an open mask.

The encapsulation layer 140 may be disposed on the light emitting element layer 130. The encapsulation layer 140 may include an inorganic layer, an organic layer, and an inorganic layer that are sequentially stacked, and the layers constituting the encapsulation layer 140 are not limited thereto.

The inorganic layers may protect the light emitting element layer 130 from moisture and oxygen, and the organic layer may protect the light emitting element layer 130 from a foreign material, such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The sensor layer 200 may be formed on the display layer 100 through a successive process. In this case, the sensor layer 200 may be expressed as being directly disposed on the display layer 100. Being "directly disposed" may mean that a third component is not interposed between the sensor layer 200 and the display layer 100. In other words, a separate adhesive member may not be interposed between the sensor layer 200 and the display layer 100. As another example, the sensor layer 200 may be connected to (e.g., coupled to or attached to) the display layer 100 through an adhesive member. The adhesive member may include a typical adhesive or a sticking agent.

The sensor layer 200 may include a base insulating layer 201, a first conductive layer 202, a detection insulating layer 203, a second conductive layer 204, and a cover insulating layer 205.

The base insulating layer 201 may be an inorganic layer including at least one of silicon nitride, silicon oxynitride, and silicon oxide. As another example, the base insulating layer 201 may be an organic layer including an epoxy resin, an acrylate resin, or an imide-based resin. The base insulating layer 201 may have a single-layer structure or a multi-layered structure stacked in the third direction DR3.

Each of the first conductive layer 202 and the second conductive layer 204 may have a single-layer structure or a multi-layered structure stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include a transparent conductive oxide, such as indium tin oxide (ITO), indium zinc oxide (IZO), zinc oxide (ZnO), indium zinc tin oxide (IZTO), or the like. The transparent conductive layer may include a conductive polymer, such as PEDOT, a metal nano wire, graphene, and/or the like.

A conductive layer of the multi-layered structure may include a plurality of metal layers. For example, the metal layers may have a three-layered structure of titanium/aluminum/titanium. The conductive layer of the multi-layered structure may include at least one metal layer, and at least one transparent conductive layer.

At least one of the detection insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the detection insulating layer 203 and the cover insulating layer 205 may include an organic film. The organic film may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 6:
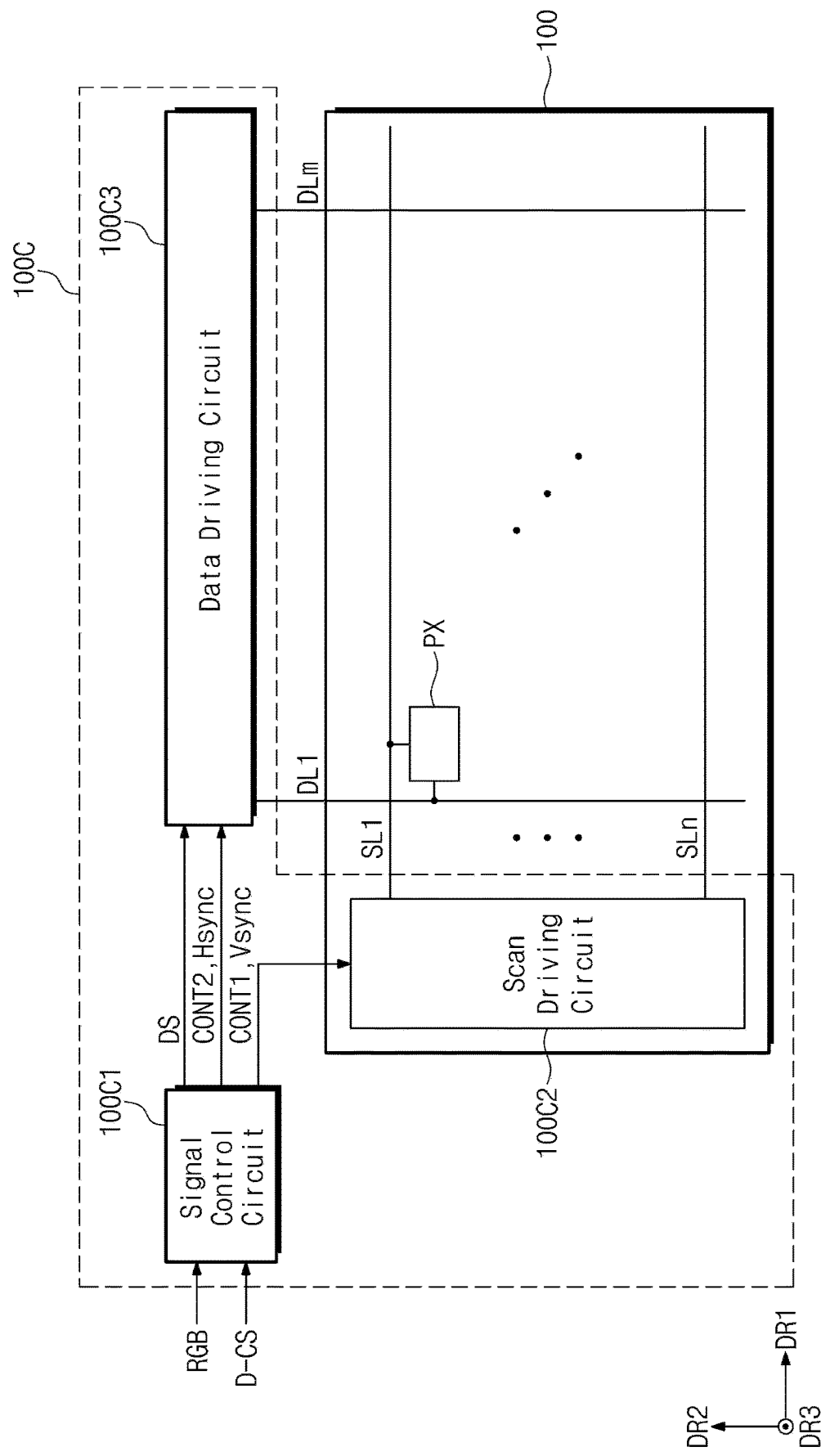
FIG. 6 is a block diagram of a display layer and a display controller, according to an embodiment of the present disclosure.

FIG. 6 is a block diagram of a display layer and a display controller, according to an embodiment of the present disclosure.

Referring to FIG. 6, the display layer 100 may include a plurality of scan wires SL1 to SLn, a plurality of data wires DL1 to DLm, and a plurality of pixels PX, where n and m are natural numbers. Each of the plurality of pixels PX may be connected to a corresponding data wire from among the plurality of data wires DL1 to DLm, and may be connected to a corresponding scan wire from among the plurality of scan wires SL1 to SLn. In an embodiment of the present disclosure, the display layer 100 may further include light emitting control wires, and the display controller 100C may further include an emission driving circuit that provides control signals to light emitting control wires. The configuration of the display layer 100 is not particularly limited thereto.

The display controller 100C may include a signal control circuit 100C1, a scan driving circuit 100C2, and a data driving circuit 100C3.

The signal control circuit 100C1 may receive the image data RGB and the control signal D-CS from the main controller 1000C (e.g., see FIG. 3). The control signal D-CS may include various suitable signals. For example, the control signal D-CS may include an input vertical synchronization signal, an input horizontal synchronization signal, a main clock, and a data enable signal.

The signal control circuit 100C1 may generate a first control signal CONT1 and a vertical synchronization signal Vsync, and may output the first control signal CONT1 and the vertical synchronization signal Vsync to the scan driving circuit 100C2, based on the control signal D-CS. The vertical synchronization signal Vsync may be included in the first control signal CONT1.

The signal control circuit 100C1 may generate a second control signal CONT2 and a horizontal synchronization signal Hsync, and may output the second control signal CONT2 and the horizontal synchronization signal Hsync to the data driving circuit 100C3, based on the control signal D-CS. The horizontal synchronization signal Hsync may be included in the second control signal CONT2.

Furthermore, the signal control circuit 100C1 may output, to the data driving circuit 100C3, a data signal DS obtained by processing the image data RGB to be suitable for an operating condition of the display layer 100. The first control signal CONT1 and the second control signal CONT2 are signals used for operations of the scan driving circuit 100C2 and the data driving circuit 100C3, and are not particularly limited thereto.

The scan driving circuit 100C2 may drive the plurality of scan wires SL1-SLn in response to the first control signal CONT1 and the vertical synchronization signal Vsync. In an embodiment of the present disclosure, the scan driving circuit 100C2 may be formed in the same or substantially the same process as that of the circuit layer 120 (e.g., see FIG. 5) in the display layer 100, but is not limited thereto. For example, the scan driving circuit 100C2 may be implemented as an integrated circuit (IC). The scan driving circuit 100C2 may be directly mounted in a suitable area (e.g., a predetermined area) of the display layer 100, or may be mounted on a separate printed circuit board in a chip on film (COF) method, and then may be electrically connected to the display layer 100.

The data driving circuit 100C3 may output grayscale voltages for driving the plurality of data wires DL1 to DLm, in response to the second control signal CONT2, the horizontal synchronization signal Hsync, and the data signal DS from the signal control circuit 100C1. The data driving circuit 100C3 may be implemented with an IC. The data driving circuit 100C3 may be directly mounted in a suitable area (e.g., a predetermined area) of the display layer 100, or may be mounted on a separate printed circuit board in a COF method, and then may be electrically connected to the display layer 100, but is not particularly limited thereto. For example, the data driving circuit 100C3 may be formed in the same or substantially the same process as that of the circuit layer 120 (e.g., see FIG. 5) in the display layer 100.

Figure 7:
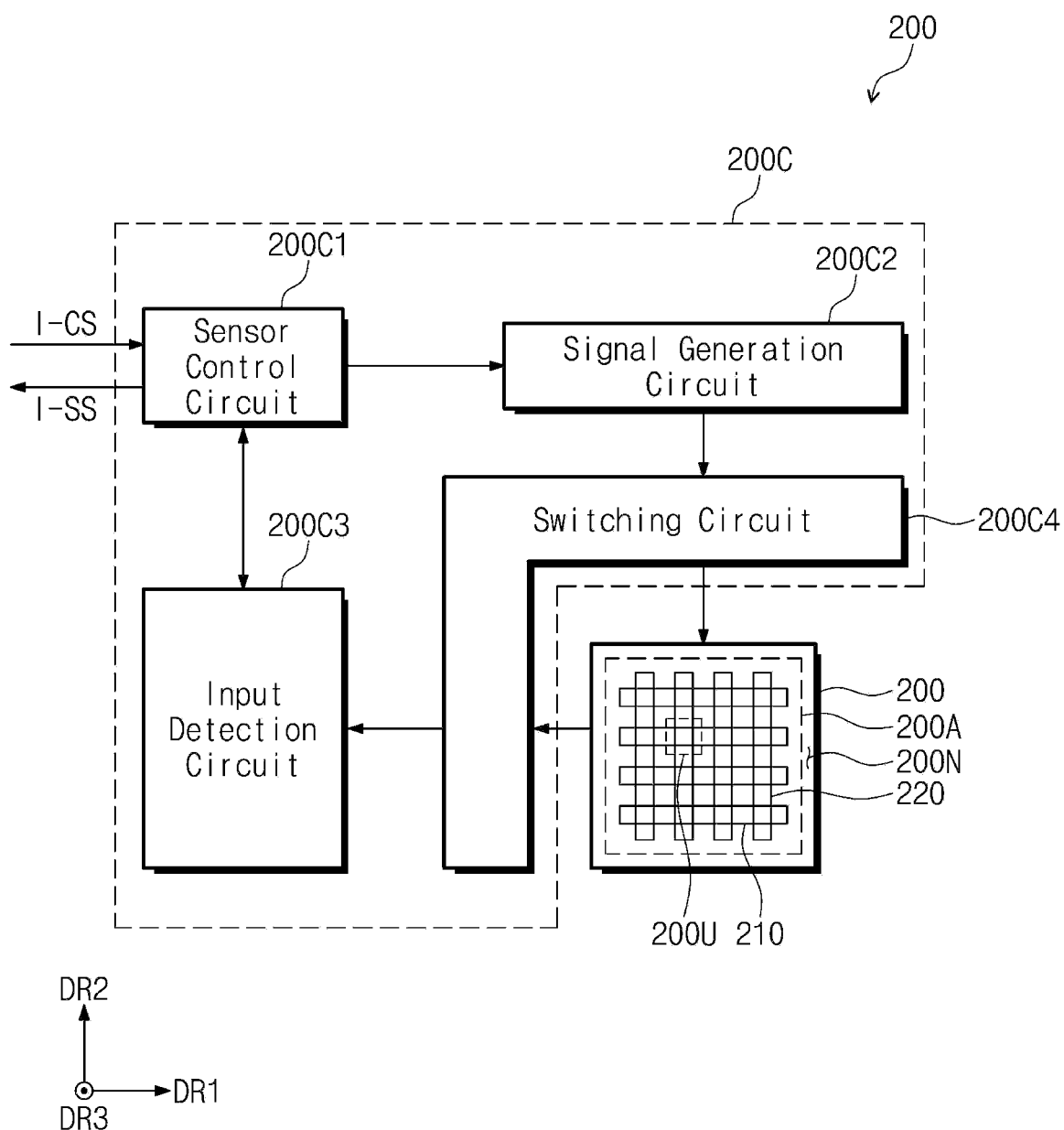
FIG. 7 is a block diagram of a sensor layer and a sensor controller, according to an embodiment of the present disclosure.

FIG. 7 is a block diagram of a sensor layer and a sensor controller, according to an embodiment of the present disclosure.

Referring to FIG. 7, an active area 200A and a peripheral area 200N may be defined in the sensor layer 200. The active area 200A may be an area that is activated depending on an electrical signal. For example, the active area 200A may be an area for sensing an input. The active area 200A may overlap with the active area 1000A of the electronic device 1000 (e.g., see FIG. 1). The peripheral area 200N may surround (e.g., around a periphery of) the active area 200A. The peripheral area 200N may overlap with the peripheral area 1000NA of the electronic device 1000 (e.g., see FIG. 1).

The sensor layer 200 may include the plurality of first electrodes 210 and the plurality of second electrodes 220. Each of the plurality of first electrodes 210 may extend in the first direction DR1. The plurality of first electrodes 210 may be arranged to be spaced from each other along the second direction DR2. Each of the plurality of second electrodes 220 may extend in the second direction DR2. The plurality of second electrodes 220 may be arranged to be spaced from each other along the first direction DR1.

The plurality of second electrodes 220 may be crossed with the plurality of first electrodes 210, so as to be insulated therefrom. Each of the plurality of first electrodes 210 may have a bar shape or a stripe shape, and each of the plurality of second electrodes 220 may have a bar shape or a stripe shape. The plurality of first electrodes 210 and the plurality of second electrodes 220 having such a shape may improve sensing characteristics of a continuous linear input. However, the shape of each of the plurality of first electrodes 210 and the shape of each of the plurality of second electrodes 220 are not limited thereto.

The sensor controller 200C may receive the control signal I-CS from the main controller 1000C, and may provide the coordinate signal I-SS to the main controller 1000C (e.g., see FIG. 3).

The sensor controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip. As another example, a part of the sensor control circuit 200C1, the signal generation circuit 200C2, and the input detection circuit 200C3 may be implemented in a different chip from another part thereof.

The sensor control circuit 200C1 may control operations of the signal generation circuit 200C2 and the switching circuit 200C4, and may calculate coordinates of an external input from a driving signal received from the input detection circuit 200C3, or may analyze information transmitted by the input device 2000 (e.g., see FIG. 3) from the modulated signal received from the input detection circuit 200C3. The sensor control circuit 200C1 may define the active area 200A of the sensor layer 200 as a plurality of areas. The sensor control circuit 200C1 may provide the uplink signal ULS to some of the plurality of areas, and may provide an antiphase signal having an inverse phase of the uplink signal ULS (e.g., see FIG. 3) to the other areas. This will be described in more detail below.

The signal generation circuit 200C2 may provide the sensor layer 200 with an output signal (or a driving signal) referred to as a "TX signal". The signal generation circuit 200C2 may output an output signal according to (e.g., matched with) an operating mode to the sensor layer 200.

The input detection circuit 200C3 may convert an analog signal, which is referred to as an "RX signal (or a detection signal)" received from the sensor layer 200, into a digital signal. The input detection circuit 200C3 may amplify the received analog signal, and then may filter the amplified analog signal. Afterward, the input detection circuit 200C3 may convert the filtered signal into a digital signal.

The switching circuit 200C4 may selectively control an electrical connection relationship from among the sensor layer 200, the signal generation circuit 200C2, and/or the input detection circuit 200C3 under the control of the sensor control circuit 200C1. Under the control of the sensor control circuit 200C1, the switching circuit 200C4 may connect one group from among the plurality of first electrodes 210 and the plurality of second electrodes 220 to the signal generation circuit 200C2, or may connect the plurality of first electrodes 210 and the plurality of second electrodes 220 to the signal generation circuit 200C2. As another example, the switching circuit 200C4 may connect one group from among the plurality of first electrodes 210 and the plurality of second electrodes 220, or all of the plurality of first electrodes 210 and the plurality of second electrodes 220, to the input detection circuit 200C3.

Figure 8:
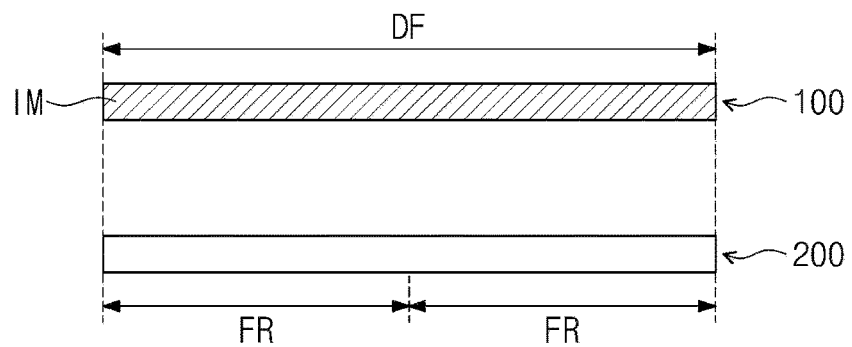
FIG. 8 is a schematic diagram illustrating operations of a display layer and a sensor layer, according to an embodiment of the present disclosure.

FIG. 8 is a schematic diagram illustrating operations of a display layer and a sensor layer, according to an embodiment of the present disclosure.

Referring to FIGS. 3 and 8, the electronic device 1000 may display the image IM through the display layer 100. The display layer 100 may display the image IM in units of a display frame DF. There may be a plurality of display frames DF. The display frame DF may operate at a first operating frequency. The first operating frequency may be 120 Hertz (Hz). In this case, a time corresponding to the one display frame DF may be 8.33 millisecond (ms). However, this is provided as an example. The first operating frequency is not limited thereto. For example, the first operating frequency may be 60 Hz.

The electronic device 1000 may detect an external input through the sensor layer 200. The sensor layer 200 may detect the input in units of a frame FR. There may be a plurality of frames FR. The frame FR may operate at a second operating frequency. The second operating frequency may be 240 Hz. In this case, a period corresponding to the one frame FR may be 4.16 ms. However, this is provided as an example. The second operating frequency is not limited thereto. For example, the second operating frequency may be 120 Hz. The second operating frequency may be higher than or equal to the first operating frequency.

FIG. 8 shows that two frames FR correspond to one display frame DF. However, the relationship between the display frame DF and the frame FR is not limited thereto. For example, four frames FR may correspond to one display frame DF, or one frame FR may correspond to one display frame DF.

The frame FR may operate according to a suitable protocol (e.g., a predetermined protocol). The protocol may include a universal stylus initiative (USI). However, this is provided as an example. The protocol is not limited thereto. For example, the protocol may include an active electrostatic method protocol (AES), or a Microsoft pen protocol (MPP).

The electronic device 1000 may detect the first input TC1 and the second input TC2, while displaying the image IM through the display layer 100. Based on whether the input device 2000 is present, the electronic device 1000 may operate in a first mode MD1 (e.g., see FIG. 9) for detecting the first input TC1, or may operate in a second mode MD2 (e.g., see FIG. 11) for detecting the second input TC2. For example, when the input device 2000 is not detected, the electronic device 1000 may operate in the first mode MD1 (e.g., see FIG. 9). When the input device 2000 is detected, the electronic device 1000 may operate in the second mode MD2 (e.g., see FIG. 11). This will be described in more detail below.

Figure 9:
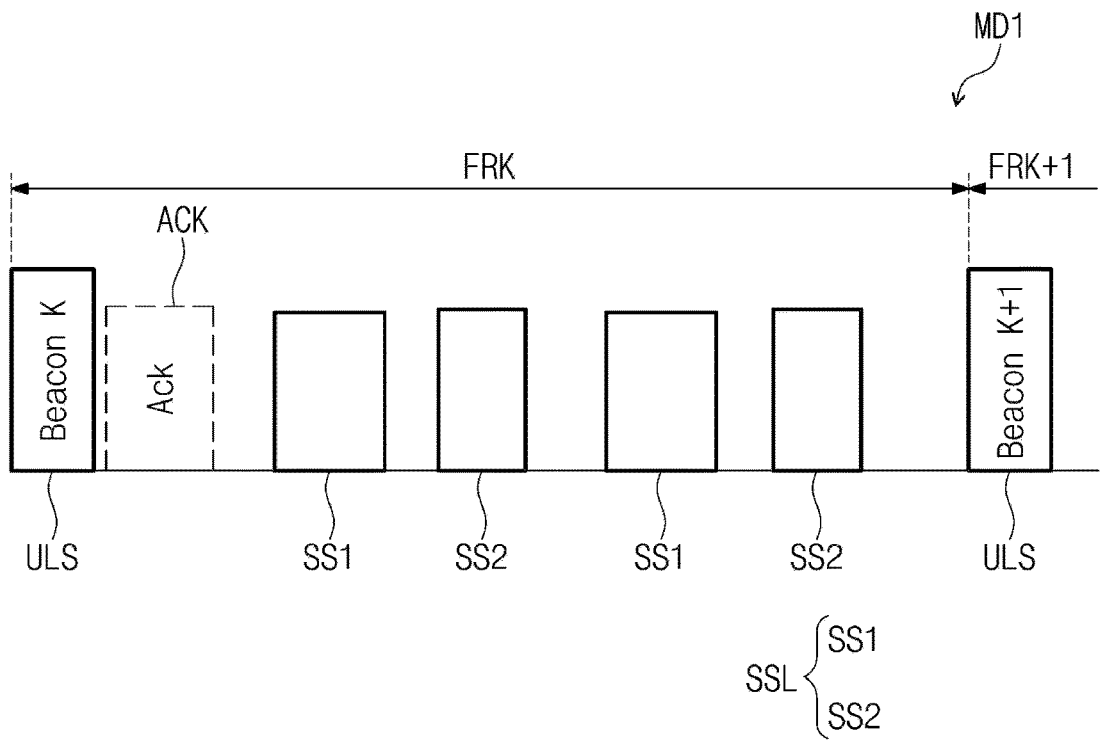
FIG. 9 is a schematic diagram illustrating an operation in a first mode, according to an embodiment of the present disclosure.
Figure 10A:
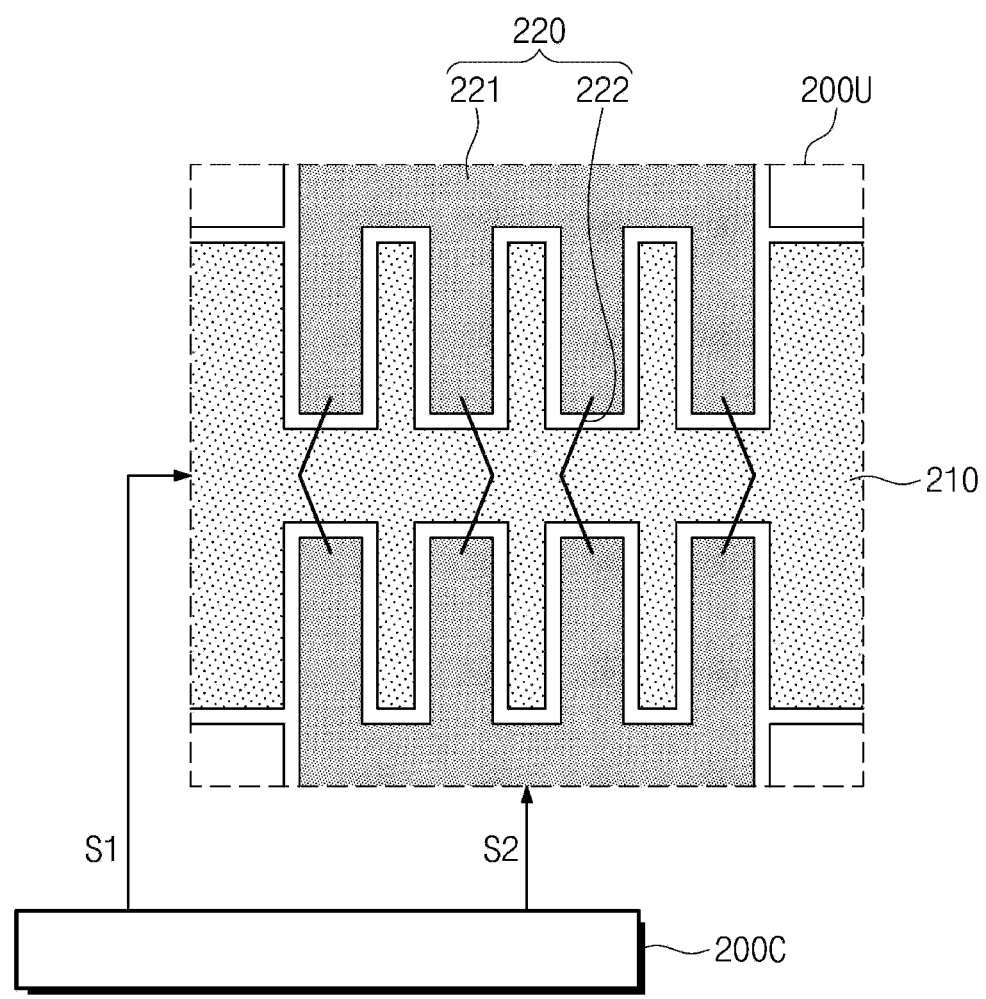
FIGS. 10A-10B are diagrams illustrating a sensor layer operating in a first mode, according to an embodiment of the present disclosure.
Figure 10B:
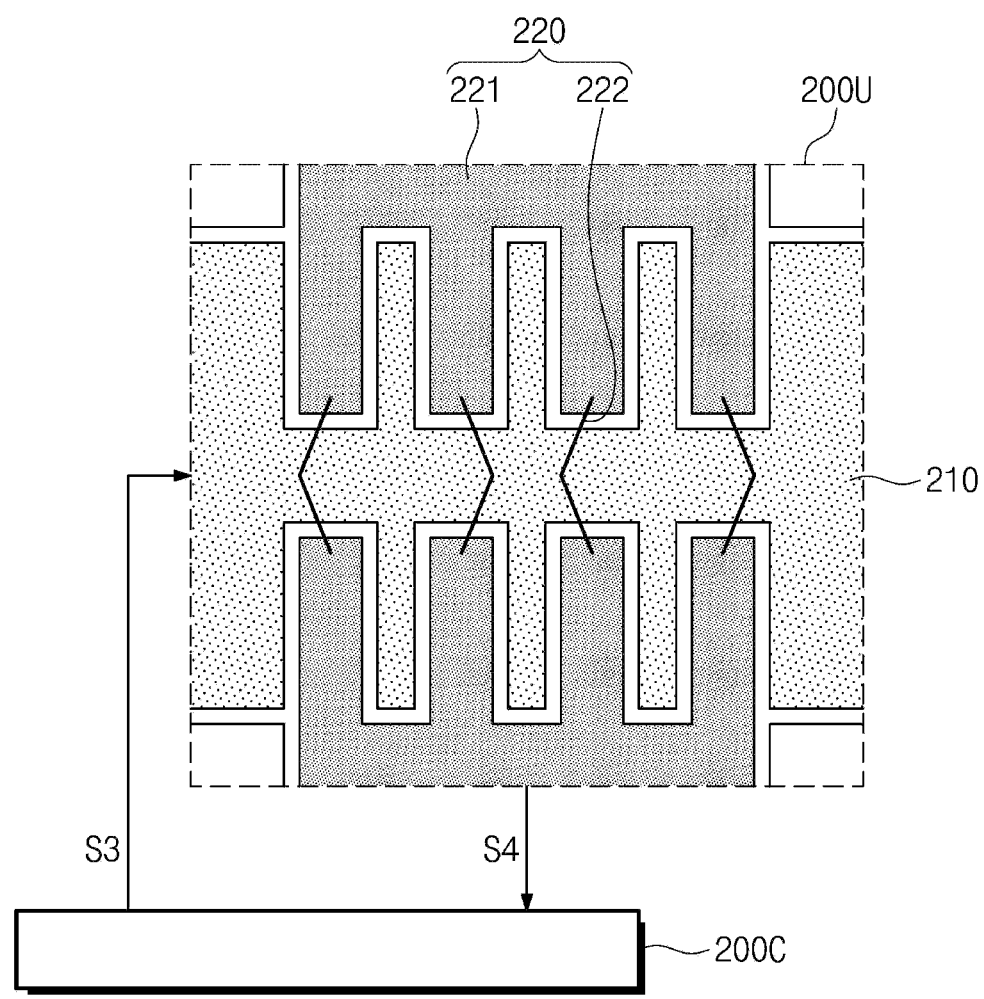

FIG. 9 is a schematic diagram illustrating an operation in a first mode, according to an embodiment of the present disclosure. FIGS. 10A and 10B are diagrams illustrating a sensor layer operating in a first mode, according to an embodiment of the present disclosure.

Referring to FIGS. 3 and 9 through 10B, the sensor controller 200C may provide the uplink signal ULS to the outside through the sensor layer 200. This will be described in more detail below. The uplink signal ULS may be referred to as a "beacon signal".

The sensor controller 200C may transmit the uplink signal ULS to the input device 2000, and may drive the sensor layer 200 in the first mode MD1 or the second mode MD2 (e.g., see FIG. 11), based on whether an acknowledgment signal ACK is received from the input device 2000.

When the electronic device 1000 is not adjacent to the input device 2000, the uplink signal ULS may not be provided to the input device 2000. In this case, the sensor layer 200 may not receive the acknowledgment signal ACK for the uplink signal ULS of the input device 2000. When the sensor controller 200C does not receive the acknowledgment signal ACK, the sensor controller 200C may drive the sensor layer 200 in the first mode MD1.

In the first mode MD1, the uplink signal ULS and at least one sensing signal SSL may be provided in the one frame FR (e.g., see FIG. 8).

The sensing signal SSL may include a first sensing signal SS1 and a second sensing signal SS2. In other words, the at least one first sensing signal SS1 and the at least one second sensing signal SS2 may be provided in a k-th frame FRk. In this case, 'k' may be a positive integer.

In the k-th frame FRk, the uplink signal ULS, the first sensing signal SS1, the second sensing signal SS2, the first sensing signal SS1, and the second sensing signal SS2 may be provided in that order. In the k-th frame FRk, the first sensing signal SS1 may be provided twice, and the second sensing signal SS2 may be provided twice.

When the sensor layer 200 operates in the first mode MD1, the sensor layer 200 may detect the first input TC1 during the k-th frame FRk.

The sensor controller 200C may transmit the first sensing signal SS1 to both the plurality of first electrodes 210 and the plurality of second electrodes 220. The sensor layer 200 may detect the first input TC1 by integrating the plurality of first electrodes 210 and the plurality of second electrodes 220 into one electrode. In this case, the sensor layer 200 may be defined as operating in a self-touch method.

FIG. 10A illustrates a portion of the sensor layer 200 that is operating in the self-touch method. A portion of the one first electrode 210 and a portion of the one second electrode 220 may be defined as one sensing unit 200U.

The second electrode 220 may include cross patterns 221, and bridge patterns 222 electrically connected to the cross patterns 221. The cross patterns 221 may be spaced apart from one another with the first electrode 210 interposed therebetween. The bridge patterns 222 may overlap with the first electrode 210, and the bridge patterns 222 may be crossed with the first electrode 210 in an insulation method.

The cross patterns 221 and the first electrode 210 may be disposed at (e.g., in or on) the same layer as each other, and the bridge patterns 222 may be disposed at (e.g., in or on) a layer different from that of the cross patterns 221 and the first electrode 210. For example, the cross patterns 221 and the first electrode 210 may be included in the second conductive layer 204 (e.g., see FIG. 5), and the bridge patterns 222 may be included in the first conductive layer 202. In this case, this structure may be referred to as a "bottom bridge structure". However, the present disclosure is not limited thereto. For example, the cross patterns 221 and the first electrode 210 may be included in the first conductive layer 202, and the bridge patterns 222 may be included in the second conductive layer 204 (e.g., see FIG. 5). This structure may be referred to as a "top bridge structure".

Each of the cross patterns 221 and the first electrode 210 may have a mesh structure. In this case, an opening may be defined in each of the cross patterns 221 and the first electrode 210. However, the present disclosure is not limited thereto, and each of the cross pattern 221 and the first electrode 210 may be formed of a transparent common electrode.

The first sensing signal SS1 may include a first signal S1 and a second signal S2. In the self-touch method, the sensor controller 200C may provide the first signal S1 to the first electrode 210, and may provide the second signal S2 to the second electrode 220. At this time, the sensor controller 200C may detect touch coordinates of the first input TC1 from the amount of charge charged in a capacitor.

The sensor controller 200C may transmit the second sensing signal SS2 to the plurality of first electrodes 210 or the plurality of second electrodes 220. The sensor layer 200 may detect the first input TC1 by capacitively coupling the plurality of first electrodes 210 and the plurality of second electrodes 220 to each other. In this case, the sensor layer 200 may be defined as operating in a mutual touch method.

FIG. 10B illustrates a portion of the sensor layer 200 operating in the mutual touch method. The second sensing signal SS2 may include an output signal S3 and a sensing signal S4. In the mutual touch method, the sensor controller 200C may provide the output signal S3 to the first electrode 210, and may receive the sensing signal S4 from the second electrode 220. In other words, the first electrode 210 may function as a transmission electrode, and the second electrode 220 may function as a reception electrode. However, the present disclosure is not particularly limited thereto. For example, the first electrode 210 may function as the reception electrode, and the second electrode 220 may function as the transmission electrode. In this case, the sensor controller 200C may detect touch coordinates of the first input TC1 from a difference in the amount of charge between the first electrode 210 and the second electrode 220.

According to an embodiment of the present disclosure, the sensor layer 200 operating in the first mode MD1 may use both the self-touch method and the mutual touch method to detect the first input TC1 in a k-th frame FRk. The sensor controller 200C may sense coordinates of the first input TC1 based on the first sensing signal SS1 and the second sensing signal SS2. The touch reliability of the first input TC1 may be improved. Accordingly, it may be possible to provide the electronic device 1000 having improved sensing reliability.

After the k-th frame FRk, a (k+1)-th frame FRk+1 may proceed. In the (k+1)-th frame FRk+1, the sensor controller 200C may provide the uplink signal ULS to the outside through the sensor layer 200. The sensor controller 200C may drive the sensor layer 200 in the first mode MD1 or the second mode MD2 (e.g., see FIG. 11), based on whether an acknowledgment signal ACK is received from the input device 2000.

Figure 11:
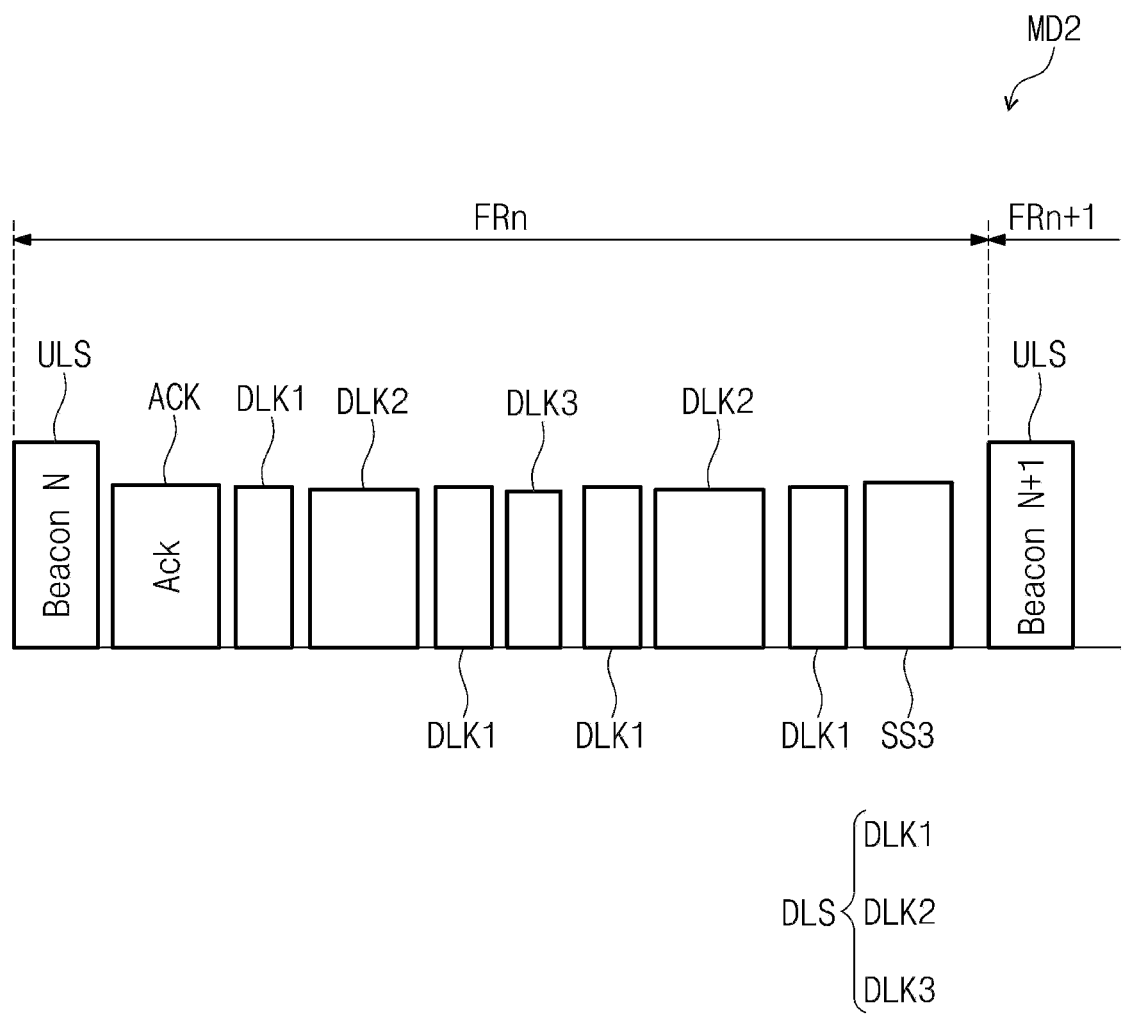
FIG. 11 is a schematic diagram illustrating an operation in a second mode, according to an embodiment of the present disclosure.
Figure 12A:
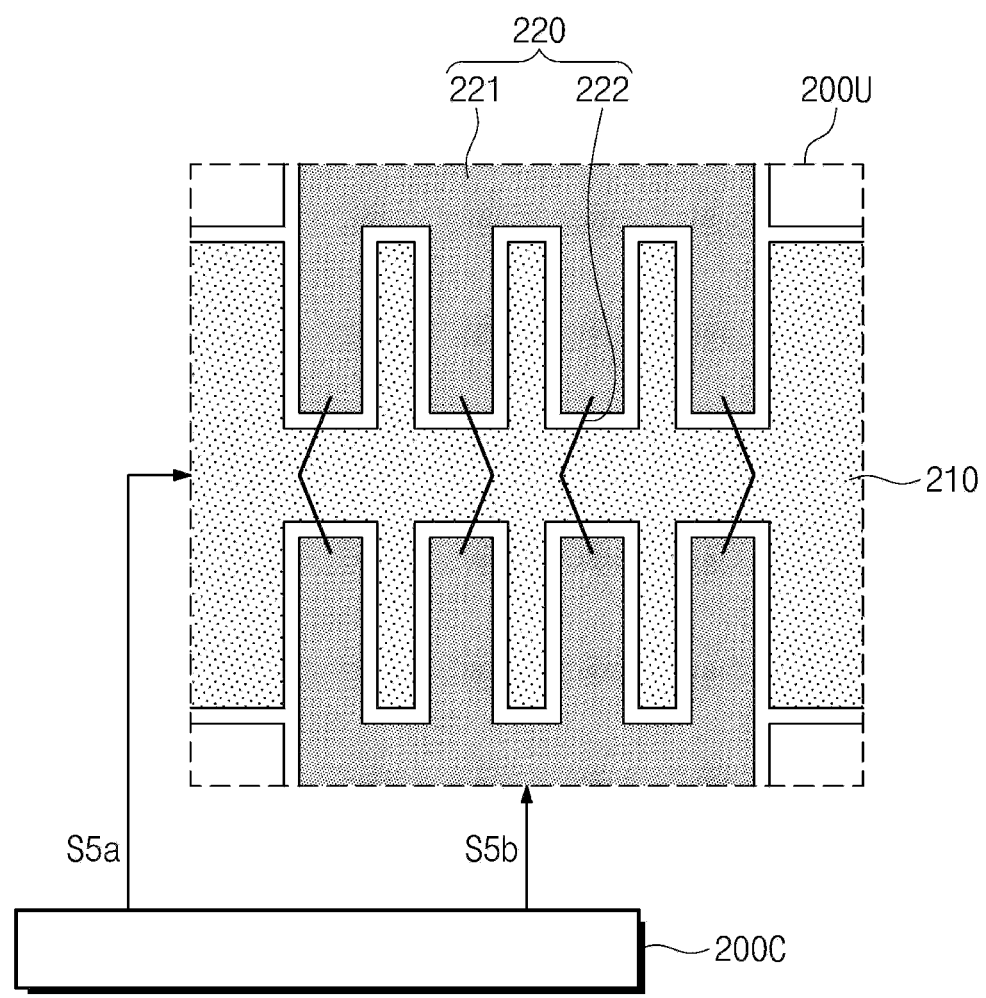
FIGS. 12A-12B are diagrams illustrating a sensor layer operating in a second mode, according to an embodiment of the present disclosure.
Figure 12B:
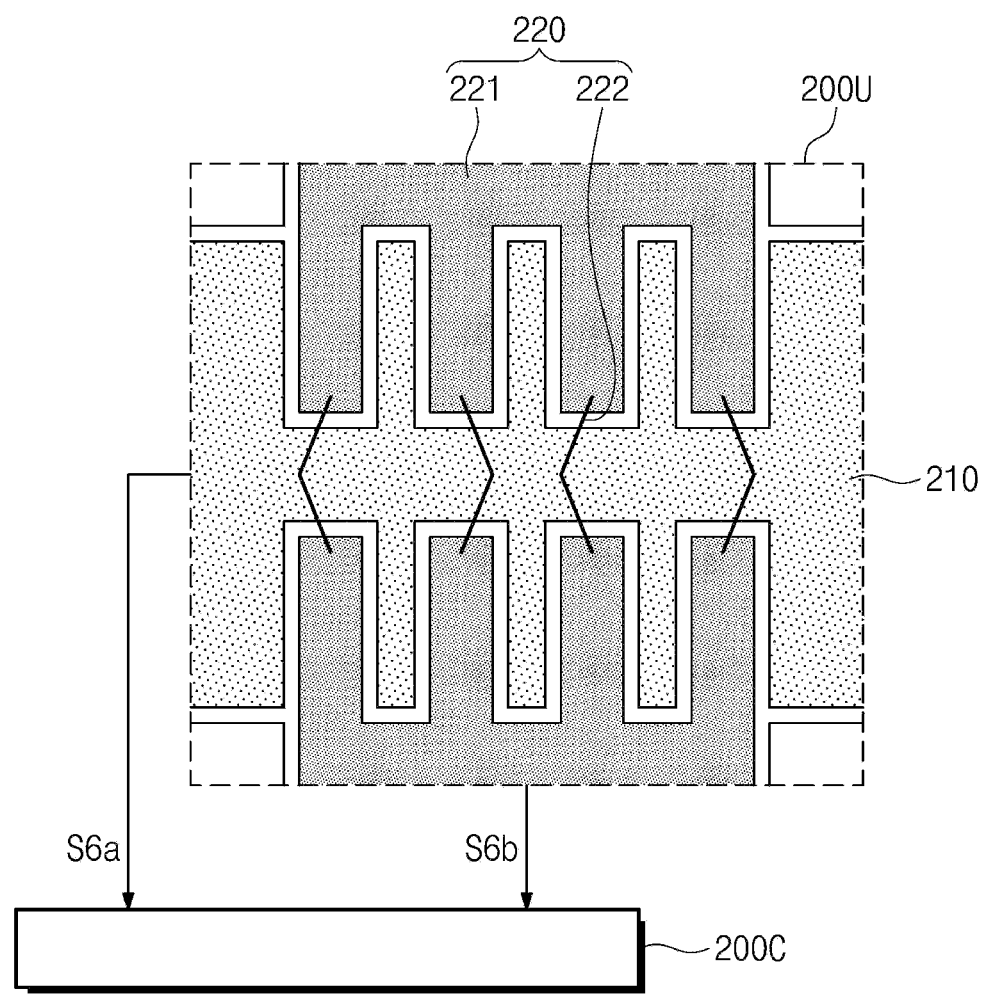

FIG. 11 is a schematic diagram illustrating an operation in a second mode, according to an embodiment of the present disclosure. FIGS. 12A and 12B are diagrams illustrating a sensor layer operating in a second mode, according to an embodiment of the present disclosure. In FIGS. 12A and 12B, the same reference numerals are assigned to the same or substantially the same components described above with reference to FIGS. 10A and 10B, and thus, redundant description thereof may not be repeated.

Referring to FIGS. 3 and 11 through 12B, the sensor controller 200C may provide the uplink signal ULS to the outside through the sensor layer 200.

The sensor controller 200C may transmit the uplink signal ULS to the input device 2000, and may drive the sensor layer 200 in the first mode MD1 (e.g., see FIG. 9) or the second mode MD2, based on whether the acknowledgment signal ACK is received from the input device 2000.

When the electronic device 1000 is adjacent to the input device 2000, the uplink signal ULS may be provided to the input device 2000. In this case, the sensor layer 200 may receive the acknowledgment signal ACK for the uplink signal ULS from the input device 2000. When the sensor controller 200C receives the acknowledgment signal ACK, the sensor controller 200C may drive the sensor layer 200 in the second mode MD2.

The second mode may be a mode in which the electronic device 1000 and the input device 2000 transmit and receive data with each other.

In the second mode MD2, the uplink signal ULS, the downlink signal DLS, and a third sensing signal SS3 may be provided in the one frame FR (e.g., see FIG. 8).

The controller 2300 may generate the downlink signal DLS according to a suitable protocol (e.g., a predetermined protocol). The protocol may include a universal stylus initiative (USI). However, this is provided as an example. The protocol according to an embodiment of the present disclosure is not limited thereto. For example, the protocol may include an active electrostatic method protocol (AES), or a Microsoft pen protocol (MPP).

The downlink signal DLS may include at least one first signal DLK1, at least one second signal DLK2, and at least one third signal DLK3. The first signal DLK1 may include first information. The first information may include coordinate information of the input device 2000. The second signal DLK2 may include second information different from the first information. The second information may include battery information of the input device 2000. The third signal DLK3 may include third information different from the first information and the second information. The third information may include slope information of the input device 2000. However, this is provided as an example. The information of the input device 2000 included in the first information, the second information, and the third information according to an embodiment of the present disclosure is not limited thereto, and may be provided in various suitable forms. For example, the first information may include battery information of the input device 2000, the second information may include slope information of the input device 2000, and the third information may include coordinate information of the input device 2000.

The at least one first signal DLK1, the at least one the second signal DLK2, and the at least one the third signal DLK3 may be provided in the n-th frame FRn. In this case, 'n' may be a positive integer.

In the n-th frame FRn, the uplink signal ULS, the first signal DLK1, the second signal DLK2, the first signal DLK1, the third signal DLK3, the first signal DLK1, the second signal DLK2, the first signal DLK1, and the third sensing signal SS3 may be provided in that order. In the n-th frame FRn, the first signal DLK1 may be provided four times, the second signal DLK2 may be provided twice, the third signal DLK3 may be provided once, and the third sensing signal SS3 may be provided once. However, this is provided as an example. For example, the number of times that each of the first signal DLK1, the second signal DLK2, the third signal DLK3, and the third sensing signal SS3 is provided according to an embodiment of the present disclosure is not limited thereto.

When the sensor layer 200 operates in the second mode MD2, the sensor layer 200 may detect the second input TC2 during the n-th frame FRn.

An operation illustrated in FIG. 12A may be an operation of providing the uplink signal ULS from the electronic device 1000 to the input device 2000. Each of the first electrode 210 and the second electrode 220 may be used as a transmission electrode for providing the uplink signal ULS from the sensor controller 200C to the input device 2000. The uplink signal ULS may be provided to the first electrode 210 and the second electrode 220 as split signals S5a and S5b, respectively. However, the present disclosure is not limited thereto. For example, the electrode 210 or the second electrode 220 may be utilized as the transmission electrode.

An operation illustrated in FIG. 12B may be an operation of providing the downlink signal DLS from the input device 2000 to the electronic device 1000. Induction signals S6a and S6b may be provided to the sensor layer 200 by the downlink signal DLS. The first electrode 210 and the second electrode 220 may be used as reception electrodes for delivering the induction signals S6a and S6b induced from the input device 2000 to the sensor controller 200C, respectively.

The third sensing signal SS3 may be provided after the first signal DLK1, which is the last signal from among the downlink signal DLS. The sensor controller 200C may transmit the third sensing signal SS3 to the plurality of first electrodes 210 or the plurality of second electrodes 220. The sensor layer 200 may detect the first input TC1 by the body 3000 of a user by capacitively coupling the plurality of first electrodes 210 and the plurality of second electrodes 220 to one another. The sensor layer 200 may operate in a mutual touch method based on the third sensing signal SS3.

When the first input TC1 by the body 3000 of a user is detected in the second mode MD2, the sensor controller 200C may output first coordinates of the first input TC1 based on the third sensing signal SS3 of each of the at least two or more frames FR (e.g., see FIG. 8), in which the first input TC1 is detected, from among the plurality of frames FR. According to an embodiment of the present disclosure, even in the second mode MD2 for detecting the second input TC2 of the input device 2000, the electronic device 1000 may monitor and detect the first input TC1 through the third sensing signal SS3. The sensor controller 200C may correct second coordinates of the second input TC2 based on the first coordinates. This will be described in more detail below.

In a comparative example, when the input device 2000 and the user's body 3000 are concurrently (e.g., simultaneously or substantially simultaneously) provided to the electronic device 1000, the uplink signal ULS may be lost through the user's body 3000. Also, the first input TC1 and the second input TC2 may be concurrently (e.g., simultaneously or substantially simultaneously) input to the sensor controller 200C. In this case, the sensor controller 200C may not accurately recognize the second coordinates of the input device 2000. Because the second coordinates may not be accurate, a linearity of a straight line displayed when the straight line is drawn on the electronic device 1000 by using the input device 2000 may be degraded.

However, according to an embodiment of the present disclosure, when the first input TC1 is detected in the second mode MD2, the sensor controller 200C may output the first coordinates of the first input TC1 based on the third sensing signal SS3 of the at least one frame FR (e.g., see FIG. 8), in which the first input TC1 is detected, from among the plurality of frames FR. The sensor controller 200C may correct the second coordinates of the second input TC2 based on the first coordinates during a period of the at least two or more frames FR (e.g., see FIG. 8), which include the at least one frame FR where the first input TC1 is detected, from among the plurality of frames FR. The linearity of the straight line displayed when the straight line is drawn on the electronic device 1000 by using the input device 2000 may be improved by the corrected second coordinates. Accordingly, the electronic device 1000 having improved sensing reliability, and the interface device INF (e.g., see FIG. 1) including the same may be provided.

After the n-th frame FRn, an (n+1)-th frame FRn+1 may proceed. In the (n+1)-th frame FRn+1, the sensor controller 200C may provide the uplink signal ULS to the outside through the sensor layer 200. The sensor controller 200C may drive the sensor layer 200 in the first mode MD1 (e.g., see FIG. 9) or the second mode MD2, based on whether the acknowledgment signal ACK is received from the input device 2000.

Figure 13:
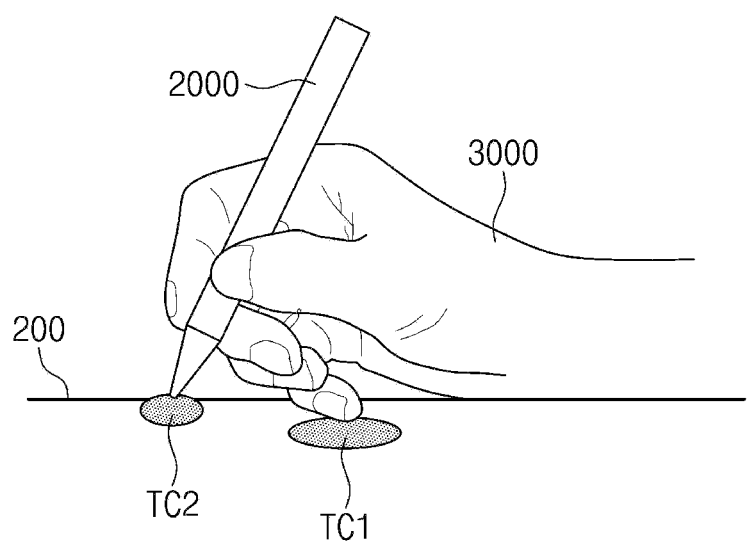
FIG. 13 illustrates a first input and a second input applied to a sensor layer, according to an embodiment of the present disclosure.
Figure 14:
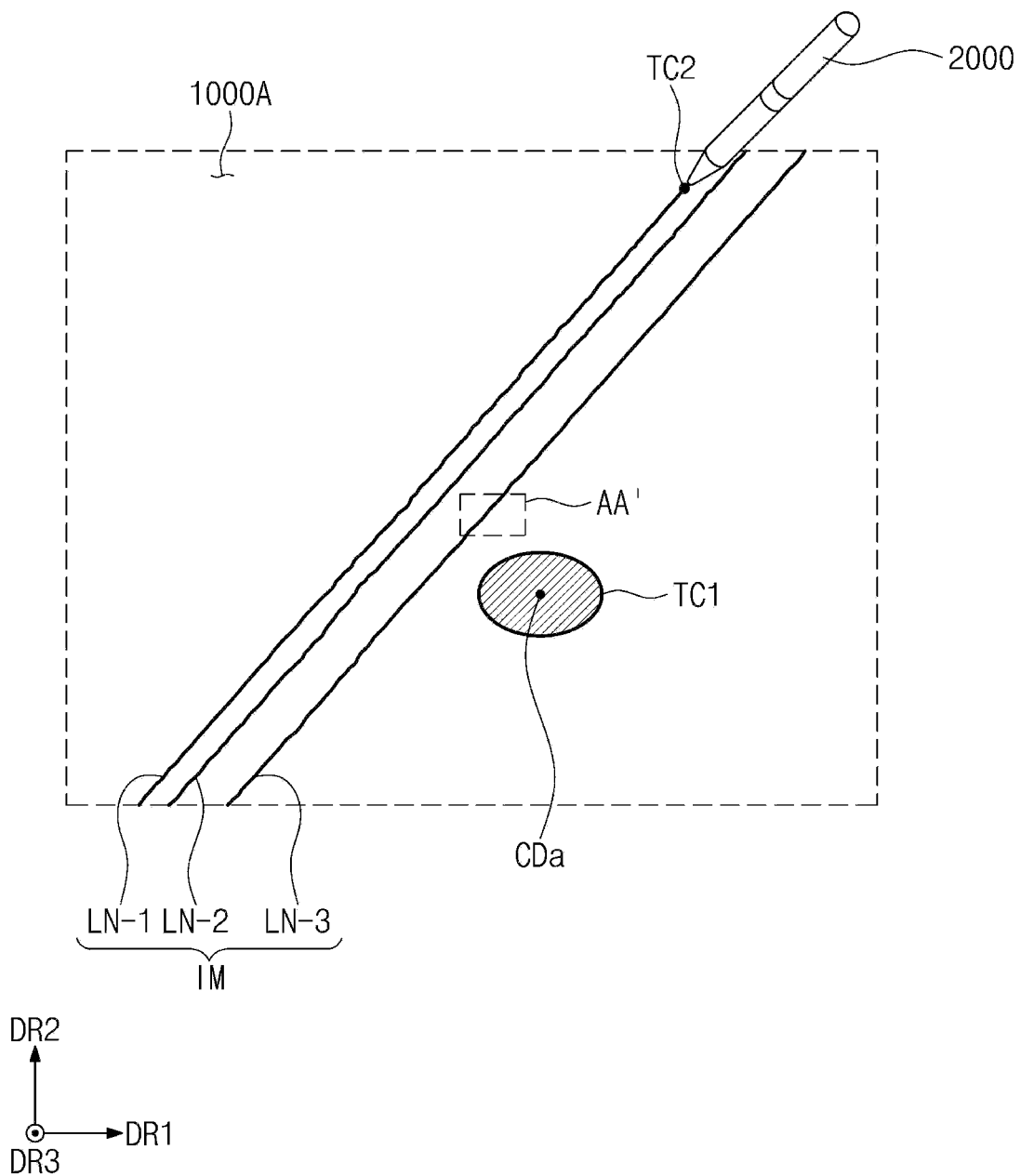
FIG. 14 is a schematic diagram illustrating operations of an electronic device and an input device, according to an embodiment of the present disclosure.

FIG. 13 illustrates a first input and a second input applied to a sensor layer, according to an embodiment of the present disclosure. In FIG. 13, the first input and the second input are shown as being applied concurrently (e.g., simultaneously or substantially simultaneously) with each other to the sensor layer 200. FIG. 14 is a schematic diagram illustrating operations of an electronic device and an input device, according to an embodiment of the present disclosure.

Referring to FIGS. 3, 13, and 14, the sensor layer 200 may sense the second input TC2 based on the input device 2000. In this case, the hand of the user holding the input device 2000 may be in contact with the sensor layer 200 to generate the first input TC1 by the body 3000 of the user concurrently (e.g., simultaneously or substantially simultaneously) with the second input TC2.

The image IM may be displayed at (e.g., in or on) the active area 1000A of the electronic device 1000. The image IM may include a first line LN-1, a second line LN-2, and a third line LN-3.

When a straight line corresponding to each of the first line LN-1, the second line LN-2, and the third line LN-3 is drawn on the electronic device 1000 by using the input device 2000, coordinates of the straight line may be converted into the coordinate signal I-SS, and may then be provided to the main controller 1000C. The main controller 1000C may operate the display controller 100C, such that the first to third lines LN-1, LN-2, and LN-3 are displayed on the display layer 100 based on the coordinate signal I-SS.

The first to third lines LN-1, LN-2, and LN-3 may be generated based on second coordinates of the second input TC2 of the input device 2000.

In a comparative example, in the case where the first input TC1 and the second input TC2 are provided concurrently (e.g., simultaneously or at the same time) as each other, when a straight line is drawn at 4 mm/s while a slope of the input device 2000 has 90 degrees, the linearity of the straight line displayed on the display layer 100 may have an error of about 1.01 mm on average, due to the interference of the first input TC1, when compared to a desired straight line.

However, according to an embodiment of the present disclosure, when the first input TC1 and the second input TC2 are detected concurrently (e.g., simultaneously or at the same time) with each other, the sensor controller 200C (e.g., see FIG. 3) may output the first coordinates of the first input TC1 based on the third sensing signal SS3 (e.g., see FIG. 11) of the at least one frame FR (e.g., see FIG. 8), in which the first input TC1 is detected, from among the plurality of frames FR. The sensor controller 200C (e.g., see FIG. 3) may correct the second coordinate of the second input TC2 based on the first coordinates during a period of the at least two or more frames FR (e.g., see FIG. 8), which include the at least one frame FR where the first input TC1 is detected, from among the plurality of frames FR. The linearity of the straight line displayed when the straight line is drawn on the electronic device 1000 by using the input device 2000 may be improved by the corrected second coordinates. For example, the linearity of the first to third lines LN-1, LN-2, and LN-3 may be improved to generate an error of about 0.55 mm on average compared to a desired straight line. Accordingly, the electronic device 1000 (e.g., see FIG. 3) having improved reliability, and the interface device INF (e.g., see FIG. 1) including the same may be provided.

Figure 15:
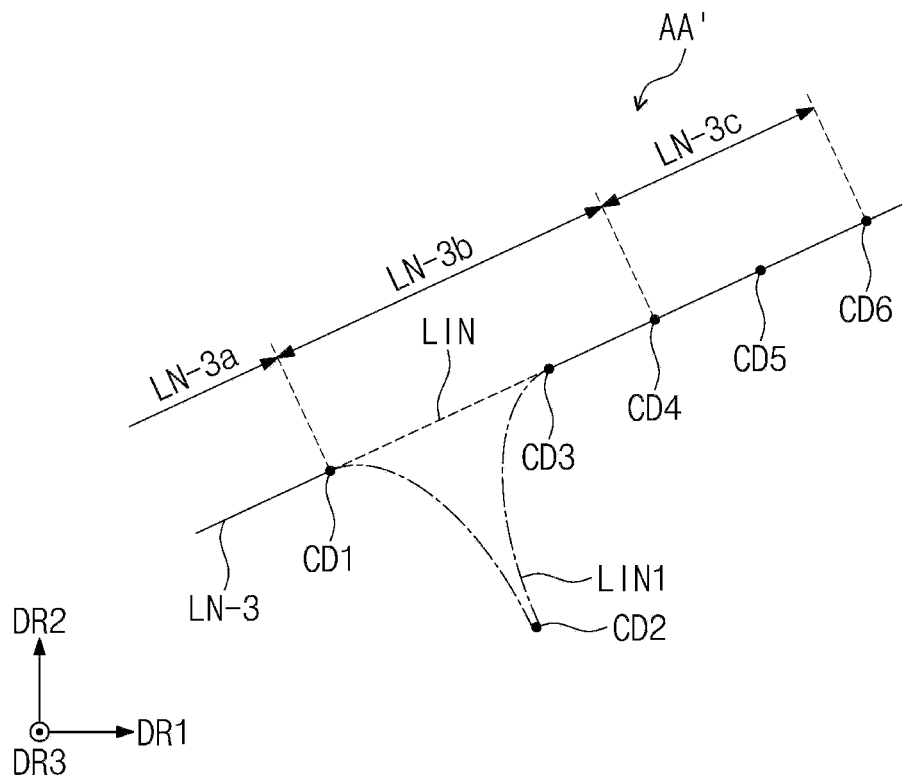
FIG. 15 is a schematic diagram illustrating an enlarged view of the area AA' of FIG. 14, according to an embodiment of the present disclosure.
Figure 16:
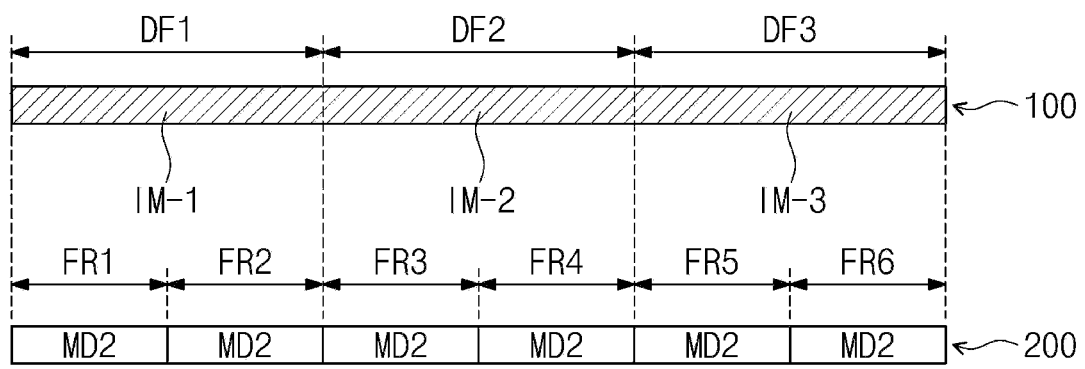
FIG. 16 is a schematic diagram illustrating operations of a display layer and a sensor layer, according to an embodiment of the present disclosure.

FIG. 15 is a schematic diagram illustrating an enlarged view of the area AA' of FIG. 14, according to an embodiment of the present disclosure. FIG. 16 is a schematic diagram illustrating operations of a display layer and a sensor layer, according to an embodiment of the present disclosure.

FIG. 16 illustrates an operation in which the second input TC2 corresponding to the third line LN-3 is provided by the input device 2000, and the first input TC1 and the second input TC2 are concurrently (e.g., simultaneously or substantially simultaneously) provided with each other in the second frame FR2. However, this is provided as an example. For example, according to an embodiment of the present disclosure, the frames in each of which the first input TC1 and the second input TC2 are concurrently (e.g., simultaneously or substantially simultaneously) provided, and the number of the frames are not limited thereto.

Referring to FIGS. 3, 11, and 14 through 16, the display layer 100 may operate in first to third display frames DF1, DF2, and DF3 that are continuous with one another. The image IM (e.g., see FIG. 1) may include the third line LN-3. In other words, the display layer 100 may display the third line LN-3. The third line LN-3 may include a first portion LN-3a, a second portion LN-3b, and a third portion LN-3c.

The sensor layer 200 may detect the first input TC1 and/or the second input TC2 by operating in first to sixth frames FR1, FR2, FR3, FR4, FR5, and FR6. The sensor layer 200 is provided with the second input TC2 by the input device 2000, and thus, each of the first to sixth frames FR1, FR2, FR3, FR4, FR5, and FR6 may operate in the second mode MD2.

In the first display frame DF1, the display layer 100 may display a first image IM-1. The first image IM-1 may include the first portion LN-3a generated based on second coordinates of the second input TC2 detected in one or more previous frames.

In the first frame FR1, the sensor controller 200C may output first sensing coordinates CD1 of the input device 2000 based on the downlink signal DLS.

In the second frame FR2, the sensor controller 200C may detect the second input TC2 of the input device 2000 based on the downlink signal DLS, and may detect the first input TC1 based on the third sensing signal SS3. In other words, the first input TC1 and the second input TC2 may be concurrently (e.g., simultaneously or substantially simultaneously) provided with each other in the second frame FR2.

When the first input TC1 is detected in the second mode MD2, the sensor controller 200C may output first coordinates CDa of the first input TC1 based on the third sensing signal SS3 of the second frame FR2 in which the first input TC1 is detected.

In a comparative example, when the first input TC1 and the second input TC2 are detected concurrently (e.g., simultaneously or at the same time) with each other, the sensor controller 200C may not accurately recognize the coordinates of the second input TC2 of the input device 2000. The sensor controller 200C may output second sensing coordinates CD2, which are detected by the interference of the first input TC1, based on the downlink signal DLS. However, the sensor controller 200C according to an embodiment of the present disclosure may correct the second sensing coordinates CD2 based on the first coordinates CDa.

When the first input TC1 and the second input TC2 are detected concurrently (e.g., simultaneously or at the same time) with each other, the sensor controller 200C may define the at least two or more frames FR (e.g., see FIG. 8) including the second frame FR2. The main controller 1000C may operate the display controller 100C, such that the sensing coordinates output in the at least two or more frames FR (e.g., see FIG. 8) are not displayed on the display layer 100.

During a period of the second to fourth frames FR2, FR3, and FR4 including the second frame FR2, the sensor controller 200C may correct the second sensing coordinates CD2 based on the first coordinates CDa. For example, the period may be 12.48 ms. FIG. 16 illustrates that three frames are accumulated. However, the number of frames according to an embodiment of the present disclosure is not limited thereto. For example, the present disclosure is not limited thereto, as long as two or more frames are secured (e.g., are accumulated). For example, when four frames are accumulated, the sensor controller 200C may correct the second sensing coordinates CD2 in real time for 16.67 ms.

In a comparative example, when a time used to process the second sensing coordinates CD2 is not sufficiently secured (e.g., sufficiently accumulated), the sensor controller 200C may fail to correct the second sensing coordinates CD2. In this case, the second image IM-2 may include an interfering line LIN1, and may be displayed on the display layer 100. Accordingly, the linearity of the third line LN-3 may be reduced. However, according to an embodiment of the present disclosure, the second to fourth frames FR2, FR3, and FR4 may be referred to as "accumulated frames" FR2, FR3, and FR4. The display layer 100 may not display the second coordinates of the second input TC2 detected in the accumulated frames FR2, FR3, and FR4. The display layer 100 may wait until the second sensing coordinates CD2 is corrected by the sensor controller 200C, without displaying the interfering line LIN1.

In the second display frame DF2, the display layer 100 may display a second image IM-2. The second image IM-2 may not include the interfering line LIN1, but may include only the first portion LN-3a.

The sensor controller 200C may determine that the second sensing coordinates CD2 are interfering coordinates that degrade the linearity of the third line LN-3, based on the first coordinates CDa. When the second sensing coordinates CD2 are determined to be the interfering coordinates, the sensor controller 200C may ignore the second sensing coordinates CD2.

In the third frame FR3 and the fourth frame FR4, the sensor controller 200C may output third sensing coordinates CD3 and fourth sensing coordinates CD4 of the input device 2000 based on the downlink signal DLS, respectively.

The sensor controller 200C may output information about a path LIN for connecting the sensing coordinates CD1 and the sensing coordinates CD3 sensed in the two frames FR1 and FR3 to each other, which are spaced from each other due to the second frame FR2, where the ignored second sensing coordinates CD2 are detected, being interposed between the two frames FR1 and FR3. The display controller 100C may allow the path LIN to be displayed on the display layer 100 based on the information about the path LIN. In other words, the sensor controller 200C may generate information about the path LIN by connecting the first sensing coordinates CD1 to the third sensing coordinates CD3 with a straight or substantially straight line. The sensor controller 200C may ignore the second sensing coordinates CD2 that is the interfering coordinates, and may correct the linearity of the input device 2000 by generating the information about the path LIN based on the first sensing coordinates CD1 and the third sensing coordinates CD3.

In the third display frame DF3, the display layer 100 may display a third image IM-3. The third image IM-3 may include the first portion LN-3a and the second portion LN-3b including the corrected path LIN. The main controller 1000C may operate the display controller 100C, such that the second portion LN-3b is displayed on the display layer 100 based on the coordinate signal I-SS including the first sensing coordinates CD1, information about the path LIN, the third sensing coordinates CD3, and the fourth sensing coordinates CD4.

The display controller 100C may display the corrected path LIN on the display layer 100 in the display frame DF3, after the accumulated frames FR2, FR3, and FR4.

According to an embodiment of the present disclosure, when the first input TC1 is detected in the second mode MD2, the sensor controller 200C may output the first coordinates CDa of the first input TC1 based on the third sensing signal SS3 of the at least one frame FR2, in which the first input TC1 is detected, from among the plurality of frames FR1, FR2, FR3, FR4, FR5, and FR6. During a period of at least two or more frames FR2, FR3, and FR4, which include the at least one frame FR2 where the first input TC1 is detected, from among the plurality of frames FR1, FR2, FR3, FR4, FR5, and FR6, the sensor controller 200C may correct coordinates of the second input TC2 based on the first coordinate CDa. The linearity of the input device 2000 may be improved by the corrected coordinates. Accordingly, the electronic device 1000 having improved reliability, and the interface device INF (e.g., see FIG. 1) including the same may be provided.

In the fifth frame FR5 and the sixth frame FR6, the sensor controller 200C may output fifth sensing coordinates CD5 and sixth sensing coordinates CD6 of the input device 2000 based on the downlink signal DLS, respectively.

The third portion LN-3c including the fifth sensing coordinates CD5 and the sixth sensing coordinates CD6 may be displayed on the display layer 100 in a display frame after the third display frame DF3.

Figure 17:
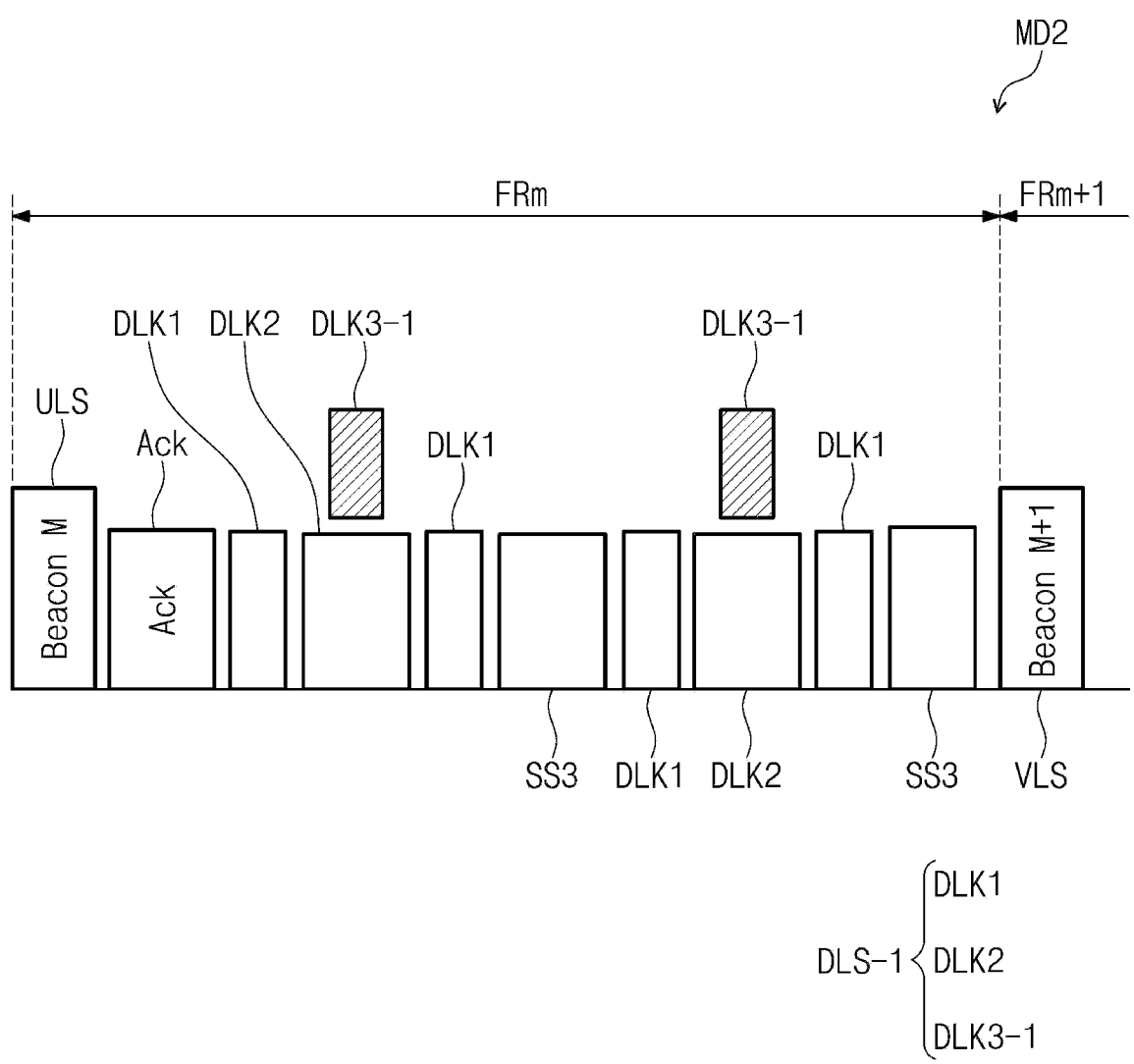
FIG. 17 is a schematic diagram illustrating an operation in a second mode, according to an embodiment of the present disclosure.

FIG. 17 is a schematic diagram illustrating an operation in a second mode, according to an embodiment of the present disclosure. In FIG. 17, the same reference numerals are assigned to the same or substantially the same components described above with reference to FIG. 11, and thus, redundant description thereof may not be repeated.

Referring to FIGS. 3 and 17, a downlink signal DLS-1 may include at least one first signal DLK1, at least one second signal DLK2, and at least one third signal DLK3-1. The first signal DLK1 may include first information. The first information may include coordinate information of the input device 2000. The second signal DLK2 may include second information different from the first information. The second information may include various suitable information, such as battery information of the input device 2000. The third signal DLK3-1 may include third information different from the first information and the second information. The third information may include slope information of the input device 2000.

The at least one first signal DLK1, the at least one the second signal DLK2, and the at least one the third signal DLK3-1 may be provided in an m-th frame FRm. In this case, 'm' may be a positive integer.

In the m-th frame FRm, the second mode MD2 may operate in a frequency-division multiplexing method.

Each of the uplink signal ULS, the first signal DLK1, the second signal DLK2, and the third sensing signal SS3 may operate at a first signal frequency. For example, the first signal frequency may be 370 kHz.

The third signal DLK3-1 may operate at a second signal frequency. The second signal frequency may have a different frequency from that of the first signal frequency. The second signal frequency may be smaller than the first signal frequency. For example, the second signal frequency may be 330 kHz. However, this is provided as an example. For example, according to an embodiment of the present disclosure, the first signal frequency and the second signal frequency are not particularly limited, as long as the first signal frequency is different from the second signal frequency.

The uplink signal ULS, the first signal DLK1, the second signal DLK2, the first signal DLK1, the third sensing signal SS3, the first signal DLK1, the second signal DLK2, the first signal DLK1, and the third sensing signal SS3 may be provided in that order. The third signal DLK3-1 may be provided concurrently (e.g., simultaneously or substantially simultaneously) when the second signal DLK2 is provided.

In the m-th frame FRm, the first signal DLK1 may be provided four times, the second signal DLK2 may be provided twice, the third signal DLK3-1 may be provided twice, and the third sensing signal SS3 may be provided twice. However, this is provided as an example. For example, the number of times that each of the first signal DLK1, the second signal DLK2, the third signal DLK3-1, and the third sensing signal SS3 is provided according to an embodiment of the present disclosure is not limited thereto.

According to an embodiment of the present disclosure, through an operation in the frequency-division multiplexing method during the m-th frame FRm, the second signal DLK2 may be provided at the first signal frequency, and the third signal DLK3-1 may be provided at the second signal frequency. The second signal DLK2 and the third signal DLK3-1 may be provided concurrently (e.g., simultaneously or at the same time) with each other. A report rate for the third information may be improved. Accordingly, the electronic device 1000 having improved reliability, and the interface device INF (e.g., see FIG. 1) including the same may be provided.

Although some embodiments of the present disclosure have been described for illustrative purposes, those skilled in the art will appreciate that various modifications and substitutions are possible, without departing from the scope and spirit of the present disclosure, as disclosed in the accompanying claims and their equivalents. Accordingly, the aspects and features of the present disclosure is not limited to those described above in the detailed description.

According to one or more embodiments of the present disclosure described above, when a first input and a second input are detected concurrently (e.g., simultaneously or at the same time) with each other, a sensor controller may output first coordinates of a first input based on a sensing signal of at least one frame, in which the first input is detected, from among a plurality of frames of a sensor layer. During a period of at least two or more frames, which include at least one frame where the first input is detected, from among the plurality of frames, the sensor controller may correct second coordinates of a second input based on the first coordinates. The linearity of a straight line displayed when the straight line is drawn on an electronic device by using an input device may be improved by the corrected second coordinates. Accordingly, an electronic device having improved sensing reliability, and an interface device including the same may be provided.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
a display layer;
a sensor layer on the display layer, and configured to operate in a first mode for detecting a first input by a touch, and a second mode different from the first mode, the second mode including a plurality of frames; and
a sensor controller configured to control the sensor layer,
wherein each of the plurality of frames comprises a downlink signal and a sensing signal,
wherein the downlink signal comprises information used to detect a second input by an input device,
wherein the sensing signal comprises information used to detect the first input, and
wherein, when the first input is detected in the second mode, the sensor controller is configured to:
output first coordinates of the first input based on the sensing signal of at least one frame in which the first input is detected from among the plurality of frames; and
correct second coordinates of the second input based on the first coordinates during a period of at least two frames including the at least one frame.

2. The electronic device of claim 1, wherein the sensor controller is configured to ignore at least one of the second coordinates detected in the at least two frames based on the first coordinates.

3. The electronic device of claim 2, further comprising a display controller configured to operate the display layer in units of a display frame,
wherein the sensor controller is configured to output information about a path for connecting the second coordinates detected in two frames that are spaced from each other with the at least one frame, in which the ignored at least one of the second coordinates is detected, being between the two frames, and
wherein the display controller is configured to display the path on the display layer in the display frame after the at least two frames.

4. The electronic device of claim 1, wherein the sensor controller is configured to transmit an uplink signal to the input device, and operate the sensor layer in the first mode or the second mode based on an acknowledgment signal from the input device.

5. The electronic device of claim 4, wherein, when the acknowledgment signal is not received, the sensor controller is configured to operate the sensor layer in the first mode, and
wherein, when the acknowledgment signal is received, the sensor controller is configured to operate the sensor layer in the second mode.

6. The electronic device of claim 1, wherein the sensor layer comprises:
a plurality of first electrodes, each extending in a first direction; and
a plurality of second electrodes, each extending in a second direction crossing the first direction.

7. The electronic device of claim 6, wherein the downlink signal comprises:
a first signal including first information of the input device;
a second signal including second information different from the first information; and
a third signal including third information different from the first information and the second information.

8. The electronic device of claim 7, wherein the first information includes coordinate information of the input device, and wherein the third information includes slope information of the input device.

9. The electronic device of claim 7, wherein the input device is configured to provide each of the first signal and the second signal one or more times, wherein the input device is configured to provide the downlink signal in an order of the first signal, the second signal, the first signal, the third signal, the first signal, the second signal, and the first signal, wherein the sensor controller is configured to provide the sensing signal after a last one of the first signal is provided, and wherein the sensing signal comprises a value detected by capacitively coupling the plurality of first electrodes and the plurality of second electrodes to one another.

10. The electronic device of claim 7, wherein each of the first signal and the second signal has a first signal frequency, and wherein the third signal has a second signal frequency different from the first signal frequency.

11. The electronic device of claim 10, wherein the first signal frequency is greater than the second signal frequency.

12. An interface device comprising:
an electronic device comprising:
a display layer;
a sensor layer on the display layer; and
a sensor controller configured to control the sensor layer; and
an input device configured to communicate with the electronic device, wherein the sensor layer is configured to operate in a plurality of frames, detect first coordinates by a touch, and detect second coordinates by the input device, wherein each of the plurality of frames sequentially comprises an uplink signal, a downlink signal, and a sensing signal, wherein the sensor layer is configured to provide the uplink signal to the input device, wherein the input device is configured to provide the downlink signal to the sensor layer, wherein the sensing signal comprises information to detect the touch, and wherein, when the touch is detected, the sensor controller is configured to:
output the first coordinates based on the sensing signal of at least one frame in which the touch is detected from among the plurality of frames; and
correct the second coordinates based on the first coordinates during a period of at least two frames including the at least one frame.

13. The interface device of claim 12, wherein the electronic device further comprises a display controller configured to operate the display layer in units of a display frame, wherein the sensor controller is configured to output information about a path for connecting coordinates of the input device detected in two frames spaced from each other with the at least one frame, in which the touch is detected, from among the plurality of frames being between the two frames, and wherein the display controller is configured to display the path on the display layer in the display frame after the at least two frames.

14. The interface device of claim 12, wherein the input device comprises:
a housing:
a power supply in the housing;
a controller in the housing, and configured to receive power from the power supply;
a communication circuit configured to exchange the uplink signal and the downlink signal with the sensor layer; and
a pen electrode electrically connected to the communication circuit.

15. The interface device of claim 14, wherein the controller is configured to generate the downlink signal according to a protocol, and wherein the protocol includes universal stylus initiative (USI).

16. The interface device of claim 12, wherein the downlink signal comprises a first signal including first information of the input device, a second signal including second information different from the first information of the input device, and a third signal including third information different from the first information and the second information, wherein the first information includes coordinate information of the input device, and wherein the third information includes slope information of the input device.

17. The interface device of claim 16, wherein the input device is configured to provide each of the first signal and the second signal one or more times, wherein the input device is configured to provide the downlink signal in an order of the first signal, the second signal, the first signal, the third signal, the first signal, the second signal, and the first signal, and wherein the sensor controller is configured to provide the sensing signal after a last one of the first signal is provided.

18. The interface device of claim 16, wherein each of the first signal and the second signal has a first signal frequency, and wherein the third signal has a second signal frequency different from the first signal frequency.

19. The interface device of claim 18, wherein the first signal frequency is greater than the second signal frequency.

20. The interface device of claim 18, wherein the electronic device is configured to concurrently receive the second signal and the third signal with each other.

* * * * *